US006242405B1

(12) United States Patent
Lykke et al.

(10) Patent No.: US 6,242,405 B1
(45) Date of Patent: *Jun. 5, 2001

(54) ENZYME-CONTAINING PARTICLES AND LIQUID DETERGENT CONCENTRATE

(75) Inventors: Mads Lykke, Bronshoj (DK); Kishor Kumar Mistry, West Yorkshire (GB); Ole Simonsen, Soborg (DK); Kenneth Charles Symes, West Yorkshire (GB)

(73) Assignees: Novo Nordisk A/S; Novozymes A/S, both of Bagsvaerd (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/875,052

(22) PCT Filed: Dec. 23, 1996

(86) PCT No.: PCT/GB96/03231

§ 371 Date: Jan. 8, 1998

§ 102(e) Date: Jan. 8, 1998

(87) PCT Pub. No.: WO97/24177

PCT Pub. Date: Jul. 10, 1997

(30) Foreign Application Priority Data

Dec. 29, 1995 (GB) .................................................. 9526706
Apr. 18, 1996 (GB) .................................................. 9608026
Apr. 18, 1996 (GB) .................................................. 9608031
May 28, 1996 (GB) .................................................. 9611066
May 28, 1996 (GB) .................................................. 9611068
Jun. 18, 1996 (GB) .................................................. 9612675

(51) Int. Cl.[7] ............................. C12N 11/02; C08K 9/10; C11D 3/00
(52) U.S. Cl. .................... 510/321; 510/320; 435/177; 435/188; 523/201

(58) Field of Search .................................... 510/530, 321, 510/392, 393, 320; 435/182, 180, 188, 177; 424/450; 428/402.21; 264/4.7, 4.1, 4.3; 523/201, 202, 205, 207, 210

(56) References Cited

U.S. PATENT DOCUMENTS

| 3,429,827 | | 2/1969 | Ruus ................................. 252/316 |
| 4,425,434 | * | 1/1984 | Rosevear ........................... 435/176 |
| 4,534,783 | * | 8/1985 | Beestman ............................ 71/27 |
| 4,743,545 | * | 5/1988 | Torobin ............................. 435/41 |
| 5,156,761 | * | 10/1992 | Aaslyng et al. ............... 252/174.12 |
| 5,198,353 | * | 3/1993 | Hawkins et al. ................. 435/188 |
| 5,324,445 | * | 6/1994 | Langley et al. ............... 252/174.12 |
| 5,385,959 | * | 1/1995 | Tsaur et al. ..................... 523/201 |
| 5,492,646 | * | 2/1996 | Langley et al. ................... 252/174 |
| 5,801,140 | * | 9/1998 | Langley et al. ................... 510/530 |

FOREIGN PATENT DOCUMENTS

| 0 356 239 | | 2/1990 | (EP) ........................ C11D/3/386 |
| WO 92/20771 | | 11/1992 | (WO) ....................... C11D/3/386 |
| WO 94/25560 | | 11/1994 | (WO) ....................... C11D/11/00 |
| WO 9425560 | * | 11/1994 | (WO) ....................... C11D/11/00 |

* cited by examiner

*Primary Examiner*—Yogendra Gupta
*Assistant Examiner*—Gregory E. Webb
(74) *Attorney, Agent, or Firm*—Sughrue, Mion, Zinn, Macpeak & Seas, PLLC

(57) ABSTRACT

A liquid detergent concentrate has an outer liquid detergent phase and enzyme containing particles dispersed in the liquid phase. The particles have a polymer shell formed from a condensation polymer which is permeable to water and low molecular weight components of the outer liquid phase and the core comprises the enzyme, an inner liquid detergent phase in substantially equilibrium with the outer phase and a core polymer which causes stretching as a result of osmosis when the concentrate is diluted in water. Encapsulated precipitated enzymes are also disclosed.

17 Claims, No Drawings

ENZYME-CONTAINING PARTICLES AND LIQUID DETERGENT CONCENTRATE

This invention relates to enzyme containing particles wherein the enzyme can be controllably retained within the particles despite migration of other materials through the walls of the particles. In particular the invention relates to liquid detergent concentrates which contain particles which contain an enzyme whereby the enzyme is protected in the concentrate but is released when the concentrate is diluted in wash water. In particular it preferably relates to such concentrates which contain two enzymes wherein one would normally deactivate the other but which are protected from each other in the concentrate and which are available upon dilution in wash water.

There is extensive prior art on encapsulating active ingredients in polymeric particles so as to attempt to protect the active ingredient from the environment during storage but to permit release when required. In some processes the active ingredient is distributed through a polymeric matrix. In other processes the active ingredient is present in the core of a particle which has a polymeric shell. In some processes there is a polymeric shell surrounding a core containing a polymeric matrix and the active ingredient.

Particular difficulties arise in those instances when it is intended that release of the active ingredient should occur solely as a result of a change in the ambient environment, without any deliberate application of a release mechanism such as the application of external rupturing pressure. Particular problems also arise when the capsules are very small, for instance below 30 $\mu$m, since the capsules then have an extremely large specific surface area, ie surface area per unit mass of particles. Accordingly, even a very low permeation rate from the surface of the particles may be unacceptable with these small particles, whereas the same permeation rate from the surface of larger particles, having a much smaller specific surface area, may be acceptable.

It is known to be desirable to include detergent enzymes in liquid detergent concentrates. There have been many proposals in the literature to protect the enzyme from the continuous phase of the concentrate and/or water by providing a continuous shell and/or a matrix which is intended to protect the enzyme from the concentrate but to release it when the detergent concentrate is added to water to provide wash water. Examples are given in EP 356,239 and WO92/20771, and the prior art discussed in those. These and other known methods generally involve forming the shell by coacervation.

Although there have been proposals to include coarse particles, for instance having a size up to 1,000 $\mu$m, in detergent concentrates, in practice this is commercially unacceptable because the particles settle out from the concentrate. It is, instead, necessary that the particles could be so small that they can be stably dispersed in the concentrate, and in practice this means that they should generally have a size at least 90% by weight below 30 $\mu$m (dry size). Accordingly the particles have a very high specific area.

Unfortunately it is very difficult to select a coacervation polymer and its conditions of use on the one hand, and a polymeric or other core composition on the other, so as to obtain in particles of high specific area the optimum protection and release performance that is required. In general, either the shell is too impermeable to give effective release when required or the shell permits premature relase.

A somewhat similar problem exists in systems for immobilising enzymes for use as, for instance, catalysts in chemical (including biochemical) reactions. Either the enzyme escapes prematurely through the shell of the immobilising particles or the shell is so impermeable that it severely interferes with the necessary migration through the shell of reactants and reaction products.

A particular problem seems to arise in liquid detergents because of the tendency of the enzyme to permeate during storage through the high surface area of the coacervate shell, if the shell is capable of giving full release when required. This is probably due in part to the rather low molecular volume of the enzyme (since detergent enzymes typically have a molecular weight of the order of 20,000 to 100,000) combined with the fact that many polymer films are likely to be permeable or semi-permeable to molecules of this size. Accordingly on prolonged storage a significant amount of the enzyme may migrate through the large surface area of the shell even if the permeability of the shell appears to be low. If the shell is made sufficiently thick or cross-linked to minimise the risk of this happening it is then very difficult to achieve adequate release of the enzyme.

Various encapsulation techniques other than coacervation are known for various purposes and one such technique which has been used for other processes is inter facial condensation (IFC) polymerisation. IFC encapsulation techniques are generally conducted in oil-in-water dispersions (so that the oil phase becomes the core) but it is also known to conduct IFC encapsulation on a water-in-oil dispersion (so that the water phase becomes the core).

JP-A-63-137996 describes liquid detergents containing encapsulated materials wherein the encapsulation can be by coacervation or by IFC polymerisation. It is stated that the particle size can be from 1 $\mu$m to 30,000 $\mu$m but in each of the examples the particle size range is from 20 $\mu$m up to 100 $\mu$m or more. Accordingly it is clear that the products which are made by this process will have a coarser particle size, and therefore a very much lower specific surface area, than we require.

The objective in JP 63-137996 is to include in the core a water-soluble or water absorbent polymer that will swell sufficiently when the detergent is put into wash water to cause rupture of the capsules, with consequential release of the core. Two of the examples show relatively coarse capsules having a shell made by coacervation and having enzyme in the core. They show significant loss of activity during storage but also show that the residual activity is released quickly upon adding the detergent to water.

The other example shows coarse particles of an IFC polyester polymer shell wherein the core includes a high molecular weight dye (molecular weight 2 million) as the active ingredient together with anionic surfactant and cross-linked insoluble polymer. The coarse particles are made as a powder and are then dispersed in a shampoo. It is shown that there is no dye release during storage but that there is rupture and rapid release of the dye when the shampoo is added to water. The large particle size and the high molecular weight of dye probably contribute to the failure of the dye to permeate out of the polyester shell wall during storage.

The fact that anionic surfactant was included in the core composition indicates that the authors assumed that the shell would provide a complete barrier to the permeation of anionic surfactant through the shell. Accordingly this example suggests a shell of low specific area which is totally impermeable (inwards or outwards) to surfactant and dye while in the concentrate and which ruptures on contact with water. The shell is formed around a pre-formed particle of the cross-linked polymer. Because the dye has a molecular weight very much larger than a detergent enzyme, the fact that the dye did not permeate out of these large capsules on storage gives no useful information about how to retain and release enzyme in microcapsules having much larger surface area.

The use of block copolymers in IFC polymerisation is described in EP-A-671206.

We have found that it is not easily possible to achieve the desired result using any of the micro encapsulation procedures previously described for encapsulating detergent enzymes. In practice, either the shell wall is generally too permeable to prevent migration of the relatively low molecular weight enzyme through the high specific surface area provided by the shell wall or the shell wall is so impermeable and strong that it cannot reliably release the enzyme when the concentrate is added to wash water. The processes are not capable of easy reproducible operation to give the desired combination of properties.

One object of the invention is to provide, for the first time, a liquid detergent which includes encapsulated enzyme particles of high specific area and which can reliably be formulated so as to achieve storage stability and rapid release. Another object is to provide improved retention of enzyme while allowing selected permeation of materials into or out of the particles. Another object is to provide a method of encapsulating enzyme in such a way as to reduce unwanted or premature release.

According to a first aspect of the invention we provide a liquid detergent concentrate which, in use, is diluted with water to form wash water and this concentrate comprises an outer liquid detergent phase and enzyme-containing particles substantially stably dispersed in the liquid phase, and the enzyme-containing particles have a diameter at least 90% by weight below 30 $\mu$m and comprise a polymer shell surrounding a core, wherein the polymer shell is formed of a condensation polymer and is permeable to water and low molecular weight components of the outer liquid phase in the concentrate, and the core comprises enzyme component, an inner liquid detergent phase in substantial equilibrium with the outer liquid phase of the concentrate, and a core polymer which, upon dilution of the concentrate into wash water and osmosis of water from the wash water into the core, co-operates with the water in the core to swell the particle and stretch the shell to give a swollen particle diameter whereby the shell substantially prevents permeation of the enzyme during storage but permits permeation in wash water.

The invention includes dispersions of the particles in a suitable liquid that can be added to the liquid detergent to introduce the particles into the detergent concentrate.

Preferably the enzyme is in precipitated form within the core (generally due to a precipitating monomeric electrolyte and/or polyelectrolyte in the core). This provides additional control against premature release of the enzyme. This aspect of the invention extends to other enzyme-containing capsules.

In a second aspect of the invention we provide particles which have an aqueous core comprising an enzyme surrounded by a shell (which has preferably been formed by interfacial condensation) and the enzyme is in precipitated form within the aqueous core and is held in precipitated form by monomeric and/or polymeric electrolyte in the aqueous core.

The monomeric electrolyte (e.g., sodium sulphate) may be the only precipitant and so the core may be free of polymeric material. Preferably however polymeric electrolyte is included to cause or improve precipitation. This can, if desired, be the same core polymer as is used in the first aspect of the invention to provide the osmosis effect.

The use of polyelectrolyte as part or all of the electrolyte is preferred since it is less likely to permeate through the shell prematurely, for instance in the immobilisation of enzyme for catalysis.

The novel particles are preferably made by forming an aqueous core composition of enzyme and monomeric and/or polymeric precipitating electrolyte and thereby precipitating the enzyme in the aqueous composition, forming a water-in-oil dispersion of the aqueous composition and forming a shell around the dispersed water droplets. The shell can be formed by coacervation but preferably it is formed by interfacial condensation.

The particles can be large enough to be isolated as powder but preferably 90% by weight are below 30 $\mu$m and they are present as a dispersion in liquid (e.g., as a detergent concentrate). The preferred methods of making the particles, and the materials used in the method, are described in more detail below.

As a result of the enzyme being in precipitated form, enzyme stability is increased and there is reduced tendency for unwanted permeation through the shell. This is useful in, for instance, the immobilisation of enzymes for use in chemical catalysis (e.g., in the reaction of starch to dextrin or dextrin to glucose). Reactants and reaction products can permeate the shell but the precipitated enzyme (and polyelectraolyte if present) cannot.

It is possible to provide in the concentrates of the first aspect of the invention, that the shell before stretching is impermeable to the enzyme to the extent that the amount of enzyme that permeates through the shell during storage of the concentrate is very small. For instance at least 80% and preferably at least 90% or 95% of the original enzyme activity which is provided in the particles is retained in the particles during storage, ie the loss during storage is less than 20% of the original activity.

It is also possible to provide that the stretched shell is more permeable to the enzyme than to the core polymer and has a permeability to the enzyme such that substantially all the encapsulated enzyme escapes into the wash water. For instance at least 60% and preferably at least 80% or 90% or more of the originally provided enzyme activity is released into the wash water. Suitable methods for determining activity are given below.

The first aspect of the invention is based in part on the fact that we have now realised that, contrary to the general teachings relating to shell encapsulation of enzymes in liquid detergents, it is not necessary to protect the enzyme from all the components of the liquid detergent concentrate. Instead, we now realise that it is adequate, when using modern detergent enzymes, to allow enzyme to be contacted with major low molecular weight components in the detergent such as alkali and electrolyte and surfactant provided that the enzyme is protected from specific deleterious components, such as another enzyme with which it will interact. Accordingly we have devised an encapsulation system which provides capsules of high specific surface area and which, contrary to the general thinking in the prior art, will allow permeation of low molecular weight components of the outer liquid phase of the detergent concentrate into the capsule but which will prevent permeation of enzyme out of the capsule during storage (despite the capsule having a very small particle size) and will allow rapid release of the enzyme when the concentrate is diluted in wash water.

The low molecular weight components that equilibrate through the shell can be anything which has a molecular size significantly smaller than the encapsulated enzyme, in order that they can permeate the shell even though the enzyme cannot. They are usually surfactants and electrolytes, such as inorganic salts, and solvents.

We have now also realised that we can make use of outer liquid electrolyte that has permeated into the capsule, and this is in complete contrast to the extensive prior art which is aiming at preventing the migration of liquid electrolyte from the continuous phase of the detergent concentrate into the individual capsules. The outer liquid phase of the concentrate will usually have a high electrolyte content and is often alkaline or highly alkaline.

In the invention, we deliberately utilise a shell which is substantially not permeable to the enzyme while the particle is in the concentrate but we rely upon permeation of low molecular weight liquid components from the electrolyte-containing, outer continuous phase of the concentrate through the shell into the core to such an extent that there is substantial equilibrium between the inner liquid (in the core) and the outer liquid phase (surrounding the particle). Further, we rely upon this inner liquid phase (due to its electrolyte content) to shrink and/or precipitate the core polymer reversibly so that the shell is, during storage, sufficiently unstretched and strong that it is substantially impermeable to the enzyme. When viewed by a microscope, it is sometimes possible to see the inner liquid and core polymer as distinct phases, but substantially all the inner liquid may be absorbed into the core polymer. The core polymer may be a solid or a gel but preferably it remains in solution in the capsules.

Since the shell allows equilibration between the inner liquid and the outer liquid phase, it will also allow equilibration between wash water (when the concentrate is added to wash water) and the core. As a result, the concentration of inner liquid (and in particular of electrolyte) in the core will be reduced rapidly by osmosis when the concentrate is diluted to form wash water. This dilution of the electrolyte concentration in the core due to the inward osmosis of water results in a significant increase in the volume of liquid in the core, and results in increased internal pressure and expansion of the volume occupied by the core polymer. As a result the core expands sufficient to stretch the shell significantly. As a result of the stretching, the molecular structure of the shell is opened out and can allow the enzyme to permeate out through the shell even though the enzyme could not permeate through the shell before the particle was in the wash water and the shell became stretched.

Instead of or in addition to relying on permeation through the shell, the invention also includes the possibility of the swelling of the core and stretching of the shell being such as to cause rupture of the shell, but this generally seems to be unnecessary and preferably the release of the enzyme is primarily by permeation through the stretched shell.

It will be appreciated that the characteristics of the core polymer and the shell have to be selected with respect to each other in order to obtain the desired non-release during storage and release into wash water. If the shell initially (ie in the concentrate) has very low permeability to enzyme, the product will have satisfactory storage stability but significant swelling will be necessary before the shell is swollen sufficiently to give adequate release of the enzyme upon dilution.

Unfortunately a core polymer which co-operates with the water sufficiently to give a desirably high internal pressure and therefore adequate stretching of a very impermeable shell will generally have a tendency to swell during storage (and to stretch the shell) while exposed to the inner liquid during storage. Accordingly if high swelling of the polymer is necessary to achieve rapid release in wash water there is a substantial risk that some swelling and some release will occur during storage. It is therefore necessary that the swelling capacity of the core polymer during storage and osmosis of water into the core during storage should be inadequate to stretch the shell sufficient to increase its permeability to enzyme significantly, but that osmosis of water upon dilution and the swelling capacity of the polymer upon dilution should be sufficient to stretch the shell from an impermeable stage to a permeable (with respect to enzyme) state.

The expansion forces which are generated internally by the core polymer and water need to be greater as the strength of the shell increases and its unstretched permeability decreases. Accordingly, if the shell is very strong and impermeable during storage (so as to prevent permeation of enzyme during storage) then the core polymer must be capable of generating stronger expansion forces than would be required if the shell is weaker, but must not cause premature stretching of the shell.

The enzyme component in the core may be provided by one or more types of enzymes. There may be one or more types of enzymes in the outer liquid phase. Some of the particles may contain one or more enzymes and other particles may contain one or more other enzymes.

The first aspect of the invention is of particular value when the detergent includes a protease enzyme and one or more other types of enzymes, such as a lipase, cellulase, amylase or peroxidase. More detail of suitable enzymes is given below. One of the enzyme types, e.g. the protease, is encapsulated in accordance with the invention and so the two types are separated from each other. Prior to the invention the inclusion in a detergent concentrate of both a protease and a non-protease was liable to result in deactivation of the non-protease but the encapsulation of one of the enzyme types in accordance with the invention keeps the two types separate from one another. When the invention provides, in the second aspect, precipitated enzymes these may also be detergent enzymes or they may be of any type suitable for the intended use, for instance amyloglucosidase or any other enzyme usefully put into immobilised form by the second aspect of the invention.

The core can include material additional to the core polymer, enzyme and components which have diffused from the outer liquid phase. For instance, it may include a second polymer (for instance a peptide) which is to be protected from enzyme present in the outer liquid phase and/or it may contain a stabiliser for the encapsulated enzyme.

The use of a condensation polymer as the shell gives the opportunity more easily to select a suitable combination of core polymer and polymer shell than is available when using prior methods, such as coacervation. For instance it can be considered that for high specific area (ie very small) capsules there is a window of satisfactory performance (good storage and good release) between poor storage and good release on the one hand and poor release and good storage on the other. The use of a condensation polymer in accordance with the invention allows for a reproducible and adequate window throughout which the process can be performed reproducibly and efficiently as described herein, whereas coacervation tends to give a narrower and less reproducible window.

The particles are generally formed initially as a dispersion in a hydrocarbon or other water-immiscible liquid of particles having an aqueous core and this is then normally dehydrated. The core polymer, when initially converted to a solid core material, may have a larger volume than when inner liquid has permeated into the particles and so the particles in the liquid detergent concentrate may have a size slightly smaller than the size to which the particles were initially manufactured, but the difference in size of the particles is not usually very significant. Thus it is preferred for the particles to be made initially, in the water-immiscible liquid, to a dry size within the ranges given below, and in particular at least 90% by weight below 30 $\mu$m. By referring to the dry size of the particles we mean the size of the particles measured after the dispersion has been distilled so as to provide a substantially anhydrous core, for instance having a total water content (based on the total weight of the particles) of below 20% and usually below 10% by weight. However if, in any particular process, it is not possible to dry the dispersion then the dry size can be estimated from measurement of the wet size of the particles coupled with an estimation of the extent to which the particles would shrink if they were dried.

The size of the particles in the detergent concentrate is preferably at least 80% (and preferably at least 90%) by weight below 15 $\mu$m or 20 $\mu$m and so the number of agglomerates having a size greater than 15 $\mu$m or 20 $\mu$m should be low. Preferably the dry size is at least 70% (and preferably 80% or 90%) by weight below 10 $\mu$m. The particles can be as small as, for instance, 50% below 1 $\mu$m but preferably at least 50% and most preferably at least 70% by weight and have a size in the range 1–5 $\mu$m.

Another way of defining the size is that the mean particle size (on a weight average basis) is preferably below 20 $\mu$m and most preferably below 10 $\mu$m often in the range of 1–5 $\mu$m.

The size of the particles after the expansion of the core polymer and the stretching of the shell must be sufficient to give the desired release and generally the stretched diameter is at least 1.2 times the diameter of the initial particles and usually it is at least 1.5 or 2 times the initial diameter. It is unnecessary for the diameter to increase too much and generally it does not increase by more than 10 times its initial diameter. For instance the initial mean diameter might typically be 5 $\mu$m and the swollen stretched mean diameter might be about 12 or 15 $\mu$m. The core polymer may not occupy the full internal volume of the shell during storage, and the volume of the core polymer may increase more than the increase in volume of the particle.

The core polymer is preferably contained in a phase in the core which is separate from the inner liquid detergent phase.

The core polymer can be any polymer which during storage of the concentrate will cause only a moderate osmotic pressure on the shell and will not result in premature release of enzyme but will co-operate with water that enters by osmosis (after dilution in wash water) to cause the desired increase in pressure and stretching, thereby releasing the enzyme. The core polymer may have a sufficiently solid characteristic that it can be seen to expand during the inward permeation of water by osmosis.

If the core polymer is soluble in water its molecular volume and/or molecular weight is preferably sufficiently higher than the molecular volume and/or weight of the corresponding enzyme that the stretched shell is more permeable to the enzyme than to the polymer, as otherwise polymer may migrate out from the core ahead of the enzyme, in preference to contributing to swelling and stretching.

If the core polymer is water-soluble, it may be in solid form in the core as a result of being precipitated out of solution in the core due to the inner liquid, and in particular due to the generally high electrolyte content in that. The polymer may form an insoluble complex with the enzyme since this results in the enzyme tending to be protected from the inner liquid by the solid polymer. Suitable polymers of this type are polyvinylpyrrolidone, polyvinyl alcohol and some acrylamide polymers (including the homopolymer).

Other polymers that can be used include water-insoluble but swellable polymers such as cross-linked polymers of water-soluble monomers or copolymers of soluble and insoluble monomers, for instance as described in EP 356,239 or WO92/20771 or GB 9526668.0.

Preferably the polymer remains in solution. Suitable polymers include polyacrylamides and some natural polymers. Preferably the core polymer is a polyelectrolyte. Such a polymer is generally formed by polymerising ethylenically unsaturated ionic monomer either alone or with non-ionic monomer. The ionic monomer may be cationic but is generally anionic. The polymer may be a calcium-independent sulphonate polymer. The preferred ionic monomer is acrylic acid but other ethylenically unsaturated carboxylic acids or sulphonic acids may be used. Polyacrylic acid homopolymer and copolymers of acrylic acid and acrylamide or other water soluble non-ionic monomer are very suitable. The polymer may be in free acid form but is usually wholly or partially neutralised so that the polymer is present as a sodium or other water soluble alkali metal salt. Preferred copolymers contain 5 to 75%, often 10 to 50%, by weight sodium acrylate or other acrylic acid salt with the balance being acrylamide. The molecular weight is generally below 2 million, for instance in the range 50,000 to 400,000, often in the range 100,000 to 200,000 (measured by gel permeation chromatography).

The polymer shell can be formed of any suitable condensation polymer capable of being formed by a convenient condensation polymerisation reaction between appropriate condensation reactants. Preferably one is substantially oil soluble and water insoluble and the other is substantially water soluble. The reactants are chosen so as to give the desired condensate polymer. It is particularly preferred for the condensate to be a polyamide but other condensates which can be formed in the invention are polyesters, polyurethanes, polyureas and epoxies. The use of polyamide is particularly useful in the invention since it facilitates control of the manufacture to within the window that gives good storage and good release.

When the condensate is a polyamide, it is best obtained by reaction of a diamine (or higher amine) with a dicarboxylic acid (or higher carboxylic acid), usually as a derivative such as an acid halide or anhydride. The amine is preferably substantially water-soluble (when in free base form) and can be a material such as ethylene diamine, hexamethylene diamine, hexane diamine, diethylene tetramine, ethylene tetramine, diamino benzene, piperazine, tetramethylene pentamine or, preferably, diethylene triamine (DETA).

The acid component is preferably the oil soluble and can be in the form of an acid halide. It can be, for instance, adipyl, sebacyl or phthalyl chloride or dodecanedioc acid chloride but is preferably terephthaloyl chloride.

When the condensate polymer is a polyester it can be formed by reaction between, for instance, any of the acids or acid derivatives mentioned above as oil soluble reactant together with a water-soluble polyol such as ethylene glycol, butane diol, polycaprolactone diol or Bisphenol A.

When the condensate polymer is a polyurethane it can be formed by reaction between a suitable hydroxy or amine compound selected from any those discussed above as the water-soluble reactant and an oil soluble isocyanate reactant such as toluene di-isocyanate or other suitable material such a hexamethylenebis chloroformate.

Another type of polyurethane can be obtained by using an oil-soluble oligomeric isocyanate. This reacts with water at the interface to form amino groups which react with other isocyanate groups in the oil phase to form film at the interface.

When the condensate polymer is an epoxy, it can be made by reaction between, for instance, ethylene diamine or other water-soluble amine or hydroxy compound with an epoxy resin as oil soluble reactant.

The shell is best formed by interfacial condensation (IFC) polymerisation around particles which are to provide the core. In a preferred way of conducting the IFC polymerisation we form an emulsion of an aqueous composition comprising core material and water-soluble IPC reactant (which can be water) in a water-immiscible liquid, we include an oil- soluble IFC reactant in the water-immiscible liquid and we allow reaction to occur between the reactants, thereby forming particles of core material encapsulated within an IPC polymer shell.

The formation of the IFC shell, and the stability of the final product, can be improved by conducting the polymerisation in the presence of an oil-soluble or oil-swellable polymeric stabiliser.

When carrying out the initial manufacture of the particles having an aqueous core, an aqueous composition which is to provide the core material is dispersed into a water-immiscible non-aqueous liquid and a water-soluble IFC reactant is included. Generally the reactant is mixed into the aqueous core composition before that is dispersed in the water-immiscible liquid, but if desired it can be mixed into a pre-formed dispersion of the aqueous composition in the water-immiscible liquid. The oil-soluble polymeric stabiliser is preferably included in the oil phase before IFC polymerisation occurs and in practice it is usually preferred for the stabiliser to be added to the water-immiscible liquid before dispersing the aqueous core composition into it, although if desired some or all of the stabiliser can be added with or after the aqueous core composition.

If the oil-soluble IFC reactant is substantially unreactive under the conditions prevailing during the formation of the initial dispersion then the reactant can also be included in the water-immiscible liquid before or during the formation of the dispersion of aqueous core composition in the water-immiscible liquid. Often, however, it is preferred to form the aqueous dispersion of aqueous core composition and water-soluble IFC reactant in water-immiscible liquid which contains the amphipathic polymeric stabiliser and then mix the oil-soluble IFC reactant into the dispersion.

The formation of the dispersion will be conducted with whatever level of homogenisation is required in order to achieve the desired particle size. Usually one or more passes through a Silverson or other homogeniser may be required.

Reaction between the water-soluble and oil-soluble IFC reactants is then allowed to occur. Depending upon the combination of reactants, this may occur relatively spontaneously at the mixing temperature or, more usually, reaction is promoted by warming the entire dispersion, for instance to a temperature in the range of 30° C.–90° C. Alternatively it can be desirable to warm the dispersion to a suitable reaction temperature prior to adding the oil soluble reactant or to warm the reactant (often dissolved in solvent) prior to addition to the dispersion. The reactant can be added in neat form but in order to facilitate mixing of the oil soluble reactant into the preformed dispersion, the reactant is preferably added as a solution in an organic solvent. The solvent becomes part of the water-immiscible liquid phase of the reaction.

It is generally desirable to stir the dispersion while the reaction occurs. Although the reaction may appear to be substantially complete quite quickly, for instance within five minutes from adding the oil-soluble IFC reactant, it is generally desirable to continue the stirring at the chosen reaction temperature for at least ten minutes up to an hour or more, typically around half an hour, to give maximum opportunity for full reaction to occur. Stirring may then be discontinued and the resultant composition either used as such or, more usually, subjected to dehydration and, preferably, solvent exchange by the general methods described above.

By referring to a water-soluble IFC reactant we mean a reactant which dissolves in the aqueous core composition (or water when this is the reactant). By referring to an oil-soluble IFC reactant and oil-soluble polymeric stabiliser we mean a reactant or stabiliser which dissolves in the water-immiscible liquid. Accordingly the water-soluble IFC reactant will partition into the aqueous phase and the oil-soluble IFC reactant and the polymeric stabiliser will partition into the water-immiscible liquid with a significant partition co-efficient, usually at least 5 and generally above 10. The amphipathic stabiliser need not be truly soluble in the water-immiscible liquid (provided it is much less soluble in water) but may instead be in the form of a colloidal or other dispersion and so maybe regarded as oil-swellable.

The water-immiscible liquid can consist of a single non-aqueous liquid or can be a blend of two or more non-aqueous liquids. It should be water-immiscible so as to minimise migration of the aqueous core composition and the water-soluble IFC reactant into the oil phase. It may be any environmentally acceptable water-immiscible liquid which has convenient volatility and other properties for the formation of the dispersion and for its eventual removal by distillation (if appropriate). Preferably it is a hydrocarbon, preferably a relatively low boiling and therefore volatile, aliphatic hydrocarbon. It is normally a paraffinic hydrocarbon. It is preferably substantially free of environmentally undesirable materials such as chlorocarbons.

The polymeric stabiliser is preferably amphipathic, by which we mean that it includes recurring hydrophilic and hydrophobic monomer units.

Some degree of useful stabilisation can be achieved using non-ionic block co-polymers such as ethylene oxide-propylene oxide condensates and condensates of polyethylene glycol with hydroxy stearic acid or as in EP 671206. However it appears that the best overall results (having regards to stability in the initial emulsion, stability in the final product, and shell characteristics) are obtained when the stabiliser is a random copolymer of at least one ionic ethylenically unsaturated monomer with at least one non-ionic water-insoluble ethylenically unsaturated monomer, i.e., a polymer formed by polymerising the monomers in the presence of each other.

Accordingly, the amphipathic polymeric stabiliser is preferably ionic. It can be amphoteric or cationic but preferably is anionic and thus is preferably a co-polymer of at least one anionic monomer with at least one water-insoluble non-ionic monomer. The molar amount of the ionic monomer is generally in the range 1 to 50% (often 10 to 30%) based on the total molar amount of ionic and water-insoluble non-ionic monomers.

In general suitable stabilisers are addition copolymers containing both hydrophobic and hydrophilic moieties in such a ratio as to reside at the interface between the oil and water phase.

The water-insoluble non-ionic monomers should have a partition coefficient K between hexane and deionised water at 20° C. of at least 5 and preferably at least 10. Suitable hydrophobic monomers include higher alkyl esters of α, β-ethylenically unsaturated carboxylic acids such as dodecyl acrylate, dodecyl methacrylate, tridecyl acrylate, tridecyl methacrylate, tetradecyl methacrylate, octadecyl acrylate, Octadecyl methacrylate, ethyl half esters of maleic anhydride, diethyl maleate, and other alkyl esters derived from the reaction of alkanol having 4 to 20, preferably 8 to 20, carbon atoms, with ethylenically unsaturated carboxylic acid such as acrylic acid, methacrylic acid, fumaric acid, itaconic acid and acconitic acid. Other suitable hydrophobic monomers include styrene, alkyl styrenes such as methyl styrene, vinyl esters including vinyl acetate, vinyl halides, acrylonitrile, methacrylonitrile, ethylene, butylene, butadiene and other olefines and allyl ethers of non-ionic ethoxylated surfactants.

Suitable hydrophilic moieties include all water-soluble ethylenically unsaturated monomers that undergo addition polymerisation, such as acrylic acid, methacrylic acid, acrylamide, 2-acrylamide-2-methyl propane sulphonic acid, itaconic acid, maleic acid, fumaric acid; ethylenically unsaturated quaternary compounds such as dimethyl amino ethyl acrylate or methacrylate quaternised with methyl chloride, diallyl dimethyl ammonium chloride vinyl or allyl sulphonates, vinyl or allyl amines, hydroxy lower-alkyl esters of ethylenically unsaturated acids, and other alkylaminoalkyl—(meth) acrylates and—(meth) acrylamides.

It is particularly desirable to use a polycarboxylic acid, especially a di-carboxylic acid such as maleic acid (utilised either as the acid or the anhydride) or itaconic acid as part or all of the acid component (for distance at least 20% by weight of the acid, often at least 50%).

Other ethylenically unsaturated monomers may also be included, so as to modify the solubility parameters of the stabilisers to promote precipitation and residence at the interface between the oil and water phase.

Suitable monomers are short chain alkyl esters of ethylenically unsaturated carboxylic acids such as acrylic acid, methacrylic acid, fumaric acid, itaconic acid and aconitic acid, where the alkyl group generally contains between 1 and 4 carbon atoms e.g. methyl acrylate or methacrylate, butyl acrylate or methacrylate.

Ratios of hydrophobic to hydrophilic monomer can be between 90 parts by weight of hydrophobic monomer and 10 parts by weight of hydrophilic monomer to 20 parts by weight of hydrophobic monomer and 80 parts by weight of hydrophilic monomer.

When the short chain esters are incorporated they replace the hydrophobic monomer in the copolymer, and the dry weight ratio of short chain ester will not exceed 50 parts. Minor amounts of other non-interfering monomers can be included such as difunctional or other polyfunctional monomers.

The optimum monomer blend, and thus the optimum stabiliser in any particular process, will depend inter alia on the choice of water-immiscible liquid and the core material and the IFC reactants and the proportions of each of these.

The stabiliser usually has a molecular weight (measured by gel permeation chromatography, of above 2000 and preferably above 10,000 up to, for instance, 100,000 or 200,000.

The selection of a suitable blend can be done by performing the IFC polymerisation in a water-in-oil emulsion and subjecting the product to microscopic examination. Additionally a simple test to facilitate selection of suitable aqueous and oil phases is as follows.

The aqueous phase containing the water-soluble IFC reactant is spread as a layer in a vessel. The oil phase is spread over it with minimum intermixing at the chosen reaction temperature, the oil phase containing the chosen amount of IFC reactant. It will be found that the quality of the film which is formed at the interface varies according to the content of the two phases, for instance any stabiliser and its amount. Once a combination has been found that gives both a satisfactory water-in-oil dispersion and a film in the test described above, it is predictable that reasonable wall formation will occur. Optimum results can be selected by varying concentrations and materials and observing performance. Accordingly once a monomer concentration and stabiliser concentration has been found which gives a reasonable film, the stabiliser and its amount can be varied in successive tests and the effect on film quality observed.

When the stabiliser is replaced by, or supplemented by a significant amount of, a conventional non-polymeric water-in-oil emulsifier then film quality may deteriorate significantly and a coherent film may not be obtained. The reason for this is not clear but it seems that the emulsifier may promote emulsification of the phases and promote precipitation polymerisation within the oil phase due to hydrophilic micelle formation within the oil phase, whereas the stabiliser may promote emulsification of the phases and concentration of the polymerisation at the interface.

As described in the International application No. PCT/GB96/03231 (WO-A-9724197) filed even date herewith claiming priority from GB 9526707.6 (the entire disclosure of which is herein incorporated by reference) it is preferred that the polymer shell should comprise an association product of (a) the IFC condensation product formed by reaction between a first IFC reactant having at least two first condensation groups and a second IFC reactant having at least two second condensation groups and (b) the amphipathic polymeric stabiliser, wherein the stabiliser will concentrate at the interface between oil and water and has recurring hydrophobic groups and recurring reactive hydrophilic groups which associate with the second condensation groups. Preferably the stabiliser comprises carboxylic groups, preferably being a copolymer of monomers comprising ethylenically unsaturated dicarboxylic acid, and the second reactant is an amine. The preferred stabiliser is a copolymer of styrene and/or alkyl (meth) acrylate as hydrophobic monomer and ethylenically unsaturated polycarboxylic acid (such as maleic anhydride), and the second reactant is diethylene triamine or other free base amine which is water soluble but also has some solubility in oil.

Generally the dispersion of aqueous core composition and second IFC reactant is formed and is then blended with the first IFC reactant. Generally the dispersion is homogenised, for instance for at least three minutes, before blending with the first IFC reactant so as to allow for association to occur between reactive hydrophilic groups on the stabiliser and the second condensation groups of the second IFC reactant (e.g., association between carboxylic groups and amine groups). The association may comprise an ionic association or a condensation reaction. Preferably the water in oil dispersion is homogenised for at least three minutes and often five to twenty minutes or more before blending with the first IFC reactant. The blending is best conducted by mixing the dispersion and the first reactant under conditions wherein the weight ratio of dispersion to first reactant remains substantially constant through the blending process, for instance by in-line blending of a feed containing the dispersion and a feed containing the first reactant.

The condensation polymerisation is preferably conducted in the substantial absence (e.g., below 3%, preferably below 1% and preferably zero or near zero) of non-polymeric water-in-oil emulsifier or any other material which would interfere with satisfactory performance of the process.

The use of the polymeric stabiliser facilitates the production of more uniform particles and in particular it facilitates the production of a substantially stable dispersion. It can beneficially influence the production of the IFC shell. For instance the amount of either or both the reactants required to obtain a shell of defined properties can be reduced by optimising the stabiliser and its amount. Further the particles made using the stabiliser can be dispersed stably into another liquid (for instance the liquid detergent concentrate) more easily than if the polymeric stabiliser is not used.

The process generally comprises the subsequent step of distilling off most or all of the water from the aqueous core composition until the particles comprise a substantially anhydrous core encapsulated within the IFC polymer shell. The distillation is often referred to as azeotropic distillation as some of the organic liquid is usually distilled off with the water.

The particles are generally made initially as a water-in-oil dispersion (emulsion) in a water-immiscible liquid, generally a hydrocarbon. The resultant dispersion, optionally after distillation to render the core substantially anhydrous, can be supplied to the user as such, for instance for incorporation into a detergent concentrate. Often, however, it is preferred to exchange the water-immiscible liquid in which the dispersion is formed for a different organic liquid which can be a surfactant or a water-miscible liquid and can contain some water. However it is generally convenient for the amount of water in this liquid to be kept relatively low, for instance below 20% weight and so the final composition will be a dispersion in a substantially non-aqueous liquid.

A suitable method of achieving this change in the liquid is by a method such as is described in WO 94/25560. The method comprises forming the initial IFC dispersion in water-immiscible liquid, optionally dehydrating the dispersed particles by azeotropic distillation of the dispersion and adding to the dispersion liquid selected from surfactants and water-miscible liquids and water-immiscible liquids which is less volatile than the initial water-immiscible liquid, and distilling the initial water-immiscible liquid off from the dispersion until the amount thereof remaining in the dispersion is below 20% by weight of the liquid phase in the dispersion.

Although the dispersion is often dehydrated (before, during or after adding the surfactant or other liquid), removal of water is not essential since the water may often satisfactorily equilibrate with the continuous phase. This discovery is useful in the present invention but is also applicable to processes of the type described in WO 94/25560.

The added liquid may be water miscible and organic and may be aqueous. It may be a glycol but is usually a non-ionic or other surfactant, with the result that the final product is a dispersion of the particles in the surfactant. Thus the product may be a dispersion of aqueous particles in an aqueous liquid. The amount of particles in the dispersion may be above 5% or 10% dry weight, often above 20% or more. The dispersion may be fluid or meltable, i.e. the non-aqueous liquid may be a wax when cool and may have to be heated in order to provide a liquid state. Reference should be made to WO94/25560 for a full description of suitable materials and process conditions. When the invention is applied to liquid detergents, the enzyme should be a deteregent enzyme. When the invention is directed to the precipitation aspect, other enzymes can be incorporated according to their intended use.

An enzyme may be introduced, for example, in the form of a purified enzyme or an extract (such as a fermentation broth) containign cell debris and/or other by-products from the initial production of the enzyme. Very suitable enzymes include enzymes of types which may be usefully included in a deteregent, as well as enzymes of types employed in industrial processes (e.g., in the starch-processing industry, in textile treatment or in the protein industry).

Enzymes of relevance in the context of the present invention include, but are by no means limited to, the following [enzyme classification numbers (EC numbers) referred to herein being in accordance with the *Recommendations* (1992) *of the Nomenclature Committee of the International Union of Biochemistry and Molecular Biology,* Academic Press Inc., 1992].

Proteases (i.e., peptidases, EC 3.4), such as proteases obtainable from animals, plants or—in particular—microorganisms (notably bacterial or fungi), as well as mutants of such proteases produced by chemical modification or genetic engineering. Suitable commercially available proteases include Alcalase™, Savinase™, Everlase™, Durazym™, Esperase™ and Flavourzyme™ (all available from Novo Nordisk A/S, Denmark) Maxatase™, Maxacal™, Maxapem™ and Properase™ (available from Gist-Brocades), Purafect™ and Purafect™ OXP (available from Genencor International), as well as Opticlean™ and Optimase™ (available from Solvay Enzymes).

Lipases (e.g., triacylglycerol lipases, EC 3.1.1.3), such as lipases obtainable from animals (e.g., mammals), plants or—in particular—microorganisms (notably bacteria or fungi), as well as mutants of such lipases produced by chemical modification or genetic engineering. Lipases of types referred to in the literature as "cutinases" (such those obtainable from *Pseudomonas mendocina* as described in WO88/09367, or from *Fusarium solani* f. pisi as described, e.g., in WO90/09446) are included in this connection. Suitable commercially available lipases include Lipolase™ and Lipolase Ultra™ (available from Novo Nordisk A/S, Denmark), Lipomax™, Lumafast™ and M1 Lipase™ (available from Genencor International), and Lipase P "Amano" (available from Amano Pharmaceutical Co. Ltd.).

Amylases [e.g., α-amylases, EC 3.2.1.1, β-amylases, EC 3.2.1.2, and amyloglucosidases (glucoamylases), EC 3.2.1.3], such as amylases obtainable from microorganisms (notably bacteria or fungi), as well as mutants of such amylases produced by chemical modification or genetic engineering. Suitable commercially available amylases include Termamyl™, BAN™, Duramyl™, Fungamyl™ and AMG™ (all available from Novo Nordisk A/S, Denmark), as well as Rapidase™ and Maxamyl™ P (available from Genencor International).

Cellulases (e.g., endo-1,4-β-glucanases, EC 3.2.1.4), such as cellulases obtainable from microorganisms (notably bacteria or fungi), as well as mutants of such cellulases produced by chemical modification or genetic engineering. Suitable commercially available cellulases include Celluzyme™, Celluclast™, Cellusoft™ and Denimax™ (all available from Novo Nordisk A/S, Denmark), and KAC-500(B)™ (available from Kao Corporation).

Oxidoreductases [EC 1; including phenol-oxidases such as laccases (EC 1.10.3.2) and other enzymes classified under EC 1.10.3; and peroxidases (EC 1.11.1), notably those classified under EC 1.11.1.7], such as oxidoreductases obtainable from plants or microorganisms (notably bacteria or fungi), as well as mutants of such oxidoreductases produced by chemical modification or genetic engineering. Suitable laccases include those obtainable from fungal species within genera such as Aspergillus, Neurospora, Podospora, Botrytis, Collybia, Fomes, Lentinus, Pleurotus, Trametes, Polyporus, Rhizoctonia, Coprinus, Psatyrella, Myceliophthora, Schytalidium, Phlebia, Coriolus, Pyricularia or Rigidoporus, such as laccase obtainable from *Trametes villosa* (also previously known, inter alia, as *Polyporus pinsitus*) or from *Myceliophthora thermophila*. Suitable peroxidases include plant-derived peroxidases, such as horseradish peroxidase or soy bean peroxidase, as well as peroxidases obtainable from fungal species within genera such as Fusarium, Humicola, Trichoderma, Myrothecium, Verticillium, Arthromyces, Caldariomyces, Ulocladium, Embellizopus or Mucor, or from bacterial species within genera such as Streptomyces, Streptoverticillium, Bacillus, Rhodobacter, Rhodomonas, Streptococcus, Pseudomonas or Myxococcus. Other sources of potentially useful peroxidases are listed in B. C. Saunders et al, Peroxidase, London 1964, pp. 41–43. Particularly useful peroxidases include those obtainable from Coprinus species such as *C. cinereus* or *C. macrorhizus* (as described, e.g., in WO92/16634).

Other relevant types of enzymes within the context of the invention include xylose isomerases (EC 5.3.1.5) useful, e.g., in the conversion of D-glucose to D-fructose (e.g., in the manufacture of fructose syrups in the starch-processing industry).

As mentioned above, a stabiliser for the enzyme may be included in the core.

Preferably the enzyme is in precipitated form in the shell, the precipitation preferably being caused by electrolyte. The precipitation can be brought about by permeation of electrolyte through the shell after the formation of the particles, but preferably the enzyme is precipitated before the shell is formed around the core composition. Thus preferably the aqueous core composition comprises electrolyte which causes precipitation of the enzyme. The electrolyte preferably comprises polyelectrolyte, such as any of the polyelectrolytes discussed above, since the polyelectrolyte cannot permeate out through the shell during storage. Generally the aqueous core composition comprises monomeric electrolyte, such as sodium sulphate or any other electrolyte known to be capable of precipitating an enzyme. Best results are generally obtained when the aqueous core composition, before encapsulation in the shell, contains both polyelectrolyte and monomeric electrolyte. Examples of other monomeric electrolytes which can be used include alkali metal carbonates, bicarbonates, acetates, carboxylates and phosphates.

It should be noted that the sodium chloride-polymer system used in Example 1 of JP-A-63-137996 does not result in precipitation of the enzyme but, instead, merely encapsulates a solution of the enzyme.

The proportions of the IFC reactants, and the total weight of the polymer shell, can be selected according to the desired properties of the shell. Generally the shell provides from 2%–50%, often around 10%–30%, by weight of the total dry weight of the encapsulated material (i.e. shell and dehydrated core). The molar proportions of the water-soluble and oil soluble IFC reactants are generally in the range 10:1 to 1:10. For instance the molar ratio water-soluble reactant oil-soluble reactant may be 10:1 to 1:3 often 5:1 to 1:1.

The amount of polymeric stabiliser is generally in the range 0.1% to 10% usually around 0.5%–3%, by weight stabiliser based on the total weight of the dispersion in which the particles are formed. The amount based on the dry weight of the particles is generally in the range 0.5 to 30% often around 3%–10% by weight. The amount of aqueous core composition and water-soluble IFC reactant is usually at least 5 or 10% by weight, preferably at least 25%, but is usually not more than 60 or 70%, by weight of the aqueous dispersion.

The dry weight of the (core) in the aqueous dispersion is usually at least 2% or 5% by weight and often at least 10%. Often it is not more than 40 or 50% by weight. The amount of polymeric shell is often at least 5 or 10%, based on the total dry weight of the core plus shell, often not more than 50 or 60%.

The dispersion of enzyme particles in hydrocarbon, surfactant or other liquid can be blended into the chosen detergent concentrate.

The detergent concentrate can be any liquid detergent concentrate which has an electrolyte-containing liquid phase that can permeate through the shell to provide inner liquid having electrolyte content sufficient to cause the core polymer to be shrunken whereby it can swell when sufficient water permeates through the shell by osmosis.

As indicated above, the concentrate may contain one or more types of enzyme in particles and one or more other types of enzyme in liquid phase. If desired, different enzymes may be separately encapsulated into different particles, and the resulting sets of particles may be blended into the liquid detergent.

The amount of dilution of the liquid detergent to form the wash water depends upon the composition of the detergent and will be conventional.

The invention includes not only the detergent concentrates but also dispersions of the particles which can be added to a liquid detergent concentrate to form a concentrate according to the invention.

The concentrate may comprise a surfactant system, wherein the surfactant can be nonionic and/or anionic and/or cationic and/or ampholytic and/or zwitterionic and/or semi-polar. The concentrate may be for laundry or dish uses.

The detergent may be aqueous, typically up to 70% water and 0–30% organic solvent, or non-aqueous. The amount of surfactant may be 0.1 to 60% by weight.

The surfactant is typically present at a level from 0.1% to 60% by weight.

The surfactant is preferably formulated to be compatible with the enzyme components present in the composition. In liquid or gel compositions the surfactant is most preferably formulated in such a way that it promotes, or at least does not degrade, the stability of any enzyme in these compositions.

Preferred systems to be used according to the present invention comprise as a surfactant one or more of the nonionic and/or anionic surfactants described herein.

Polyethylene, polypropylene, and polybutylene oxide conden-sates of alkyl phenols are suitable for use as the nonionic surfactant of the surfactant systems of the present invention, with the polyethylene oxide condensates being preferred. These compounds include the condensation products of alkyl phenols having an alkyl group containing from about 6 to about 14 carbon atoms, preferably from about 8 to about 14 carbon atoms, in either a straight chain or branched-chain configuration with the alkylene oxide. In a preferred embodiment, the ethylene oxide is present in an amount equal to from about 2 to about 25 moles, more preferably from about 3 to about 15 moles, of ethylene oxide per mole of alkyl phenol. Commercially available nonionic surfactants of this type include Igepal™ CO-630, marketed by the CAF Corporation; and Triton™ X-45, X-114, X-100 and X-102, all marketed by the Rohm & Haas Company. These surfactants are commonly referred to as alkylphenol alkoxylates (e.g., alkyl phenol ethoxylates).

The condensation products of primary and secondary aliphatic alcohols with about 1 to about 25 moles of ethylene oxide are suitable for use as the nonionic surfactant of the nonionic surfactant systems of the present invention. The alkyl chain of the aliphatic alcohol can either be straight or branched, primary or secondary, and generally contains from about 8 to about 22 carbon atoms. Preferred are the condensation products of alcohols having an alkyl group containing from about 8 to about 20 carbon atoms, more preferably from about 10 to about 18 carbon atoms, with from about 2 to about 10 moles of ethylene oxide per mole of alcohol. About 2 to about 7 moles of ethylene oxide and most preferably from 2 to 5 moles of ethylene oxide per mole of alcohol are present in said condensation products. Examples of commercially available nonionic surfactants of this type include Tergitol™ 15-S-9 (The condensation product of $C_{11}$–$C_{15}$ linear alcohol with 9 moles ethylene oxide), Tergitol™ 24-L-6 NMW (the condensation product of $C_{12}$–$C_{14}$ primary alcohol with 6 moles ethylene oxide with a narrow molecular weight distribution), both marketed by Union Carbide Corporation; Neodol™ 45-9 (the condensation product of $C_{14}$–$C_{15}$ linear alcohol with 9 moles of ethylene oxide), Neodol™ 23-3 (the condensation product of $C_{12}$–$C_{13}$ linear alcohol with 3.0 moles of ethylene oxide), Neodol™ 45-7 (the condensation product of $C_{14}$–$C_{15}$ linear alcohol with 7 moles of ethylene oxide), Neodol™ 45-5 (the condensation product of $C_{14}$–$C_{15}$ linear alcohol with 5 moles of ethylene oxide) marketed by Shell Chemical Company, Kyro™ EOB (the condensation product of $C_{13}$–$C_{15}$ alcohol with 9 moles ethylene oxide), marketed by The Procter & Gamble Company, and Genapol LA 050 (the condensation product of $C_{12}$–$C_{14}$ alcohol with 5 moles of ethylene oxide) marketed by Hoechst. Preferred range of HLB in these products is from 8–11 and most preferred from 8–10.

Also useful as the nonionic surfactant of the surfactant systems of the present invention are alkylpolysaccharides disclosed in U.S. Pat. No. 4,565,647, having a hydrophobic group containing from about 6 to about 30 carbon atoms, preferably from about 10 to about 16 carbon atoms and a polysaccharide, e.g. a polyglycoside, hydrophilic group containing from about 1.3 to about 10, preferably from about 1.3 to about 3, most preferably from about 1.3 to about 2.7 saccharide units. Any reducing saccharide containing 5 or 6 carbon atoms can be used, e.g., glucose, galactose and galactosyl moieties can be substituted for the glucosyl moieties (optionally the hydrophobic group is attached at the 2-, 3-, 4-, etc. positions thus giving a glucose or galactose as opposed to a glucoside or galactoside). The intersaccharide bonds can be, e.g., between the one position of the additional saccharide units and the 2-, 3-, 4-, and/or 6- positions on the preceding saccharide units.

The preferred alkylpolyglycosides have the formula $$R^2O(C_nH_{2n}O)_t(\text{glycosyl})_x$$

wherein $R^2$ is selected from the group consisting of alkyl, alkylphenyl, hydroxyalkyl, hydroxyalkylphenyl, and mixtures thereof in which the alkyl groups contain from about 10 to about 18, preferably from about 12 to about 14, carbon atoms; n is 2 or 3, preferably 2; t is from 0 to about 10, pre-ferably 0; and x is from about 1.3 to about 10, preferably from about 1.3 to about 3, most preferably from about 1.3 to about 2.7. The glycosyl is preferably derived from glucose. To prepare these compounds, the alcohol or alkylpolyethoxy alcohol is formed first and then reacted with glucose, or a source of glucose, to form the glucoside (attachment at the 1-position). The additional glycosyl units can then be attached between their 1-position and the preceding glycosyl units 2-, 3-, 4-, and/or 6-position, preferably predominantly the 2-position.

The condensation products of ethylene oxide with a hydrophobic base formed by the condensation of propylene oxide with propylene glycol are also suitable for use as the additional nonionic surfactant systems of the present invention. The hydrophobic portion of these compounds will preferably have a molecular weight from about 1500 to about 1800 and will exhibit water insolubility. The addition of polyoxyethylene moieties to this hydrophobic portion tends to increase the water solubility of the molecule as a whole, and the liquid character of the product is retained up to the point where the polyoxyethylene content is about 50% of the total weight of the condensation product, which corresponds to condensation with up to about 40 moles of ethylene oxide. Examples of compounds of this type include certain of the commercially available Pluronic™ surfactants, marketed by BASF.

Also suitable for use as the nonionic surfactant of the nonionic surfactant system of the present invention, are the condensation products of ethylene oxide with the product resulting from the reaction of propylene oxide and ethylenediamine. The hydrophobic moiety of these products consists of the reaction product of ethylenediamine and excess propylene oxide, and generally has a molecular weight of from about 2500 to about 3000. This hydrophobic moiety is condensed with ethylene oxide to the extent that the condensation product contains from about 40% to about 80% by weight of polyoxyethylene and has a molecular weight of from about 5000 to about 11000. Examples of this type of nonionic surfactant include certain of the commercially available Tetronic™ compounds, marketed by BASF.

Preferred for use as the nonionic surfactant of the surfactant systems of the present invention are polyethylene oxide condensates of alkyl phenols, condensation products of primary and secondary aliphatic alcohols with from about 1 to about 25 moles of ethyleneoxide, alkylpolysaccharides, and mixtures hereof. Most preferred are $C_8$–$C_{14}$ alkyl phenol ethoxylates having from 3 to 15 ethoxy groups and $C_8$–$C_{18}$ alcohol ethoxylates (preferably $C_{10}$ avg.) having from 2 to 10 ethoxy groups, and mixtures thereof.

Highly preferred nonionic surfactants are polyhydroxy fatty acid amide surfactants of the formula

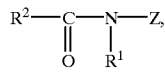

wherein $R^1$ is H, or $R_1$ is $C_{1-4}$ hydrocarbyl, 2-hydroxyethyl, 2-hydroxypropyl or a mixture thereof, $R^2$ is $C_{5-31}$ hydrocarbyl, and Z is a polyhydroxyhydrocarbyl having a linear hydrocarbyl chain with at least 3 hydroxyls directly connected to the chain, or an alkoxylated derivative thereof. Preferably, $R^1$ is methyl, $R^2$ is straight $C_{11-15}$ alkyl or $C_{16-18}$ alkyl or alkenyl chain such as coconut alkyl or mixtures thereof, and Z is derived from a reducing sugar such as glucose, fructose, maltose or lactose, in a reductive amination reaction.

Highly preferred anionic surfactants include alkyl alkoxylated sulfate surfactants. Examples hereof are water soluble salts or acids of the formula RO(A)$_m$SO$_3$M wherein R is an unsubstituted C$_{10}$-C$_{24}$ alkyl or hydroxyalkyl group having a C$_{10}$–C$_{24}$ alkyl component, preferably a C$_{12}$–C$_{20}$ alkyl or hydro-xyalkyl, more preferably C$_{12}$–C$_{18}$ alkyl or hydroxyalkyl, A is an ethoxy or propoxy unit, m is greater than zero, typically between about 0.5 and about 6, more preferably between about 0.5 and about 3, and M is H or a cation which can be, for example, a metal cation (e.g., sodium, potassium, lithium, calcium, magnesium, etc.), ammonium or substituted-ammonium cation. Alkyl ethoxylated sulfates as well as alkyl propoxylated sulfates are contemplated herein. Specific examples of substituted ammonium cations include methyl-, dimethyl, trimethyl-ammonium cations and quaternary ammonium cations such as tetramethyl-ammonium and dimethyl piperdinium cations and those derived from alkylamines such as ethylamine, diethylamine, triethylamine, mixtures thereof, and the like. Exemplary surfactants are C$_{12}$–C$_{18}$ alkyl polyethoxylate (1.0) sulfate (C$_{12}$–C$_{18}$E(1.0)M), C$_{12}$–C$_{18}$ alkyl polyethoxylate (2.25) sulfate (C$_{12}$–C$_{18}$(2.25)M, and C$_{12}$–C$_{18}$ alkyl polyethoxylate (3.0) sulfate (C$_{12}$–C$_{18}$E(3.0)M), and C$_{12}$–C$_{18}$ alkyl polyethoxylate (4.0) sulfate (C$_{12}$–C$_{18}$E(4.0)M), wherein M is conveniently selected from sodium and potassium.

Suitable anionic surfactants to be used are alkyl ester sulfonate surfactants including linear esters of C$_8$–C$_{20}$ carboxylic acids (i.e., fatty acids) which are sulfonated with gaseous SO$_3$ according to "The Journal of the American Oil Chemists Society", 52 (1975), pp. 323–329. Suitable starting materials would include natural fatty substances as derived from tallow, palm oil, etc.

The preferred alkyl ester sulfonate surfactant, especially for laundry applications, comprise alkyl ester sulfonate surfactants of the structural formula:

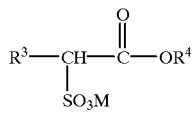

wherein R$^3$ is a C$_8$–C$_{20}$ hydrocarbyl, preferably an alkyl, or combination thereof, R$^4$ is a C$_1$–C$_6$ hydrocarbyl, preferably an alkyl, or combination thereof, and M is a cation which forms a water soluble salt with the alkyl ester sulfonate. Suitable salt-forming cations include metals such as sodium, potassium, and lithium, and substituted or unsubstituted ammonium cations, such as monoethanolamine, diethonolamine, and triethanolamine. Preferably, R$^3$ is C$_{10}$–C$_{16}$ alkyl, and R$^4$ is methyl, ethyl or isopropyl. Especially preferred are the methyl ester sulfonates wherein R$^3$ is C$_{10}$–C$_{16}$ alkyl.

Other suitable anionic surfactants include the alkyl sulfate surfactants which are water soluble salts or acids of the formula ROSO$_3$M wherein R preferably is a C$_{10}$–C$_{24}$ hydrocarbyl, preferably an alkyl or hydroxyalkyl having a C$_{10}$–C$_{20}$ alkyl component, more preferably a C$_{12}$–C$_{18}$ alkyl or hydroxyalkyl, and M is H or a cation, e.g., an alkali metal cation (e.g. sodium, potassium, lithium), or ammonium or substituted ammonium (e.g. methyl-, dimethyl-, and trimethyl ammonium cations and quaternary ammonium cations such as tetramethyl-ammonium and dimethyl piperdinium cations and quaternary ammonium cations derived from alkylamines such as ethylamine, diethylamine, triethylamine, and mixtures thereof, and the like). Typically, alkyl chains of C$_{12}$–C$_{16}$ are preferred for lower wash temperatures (e.g. below about 50° C.) and C$_{16}$–C$_{18}$ alkyl chains are preferred for higher wash temperatures (e.g. above about 50° C.).

Other anionic surfactants useful for detersive purposes can also be included in the laundry detergent compositions of the present invention. Theses can include salts (including, for example, sodium, potassium, ammonium, and substituted ammonium salts such as mono- di- and triethanolamine salts) of soap, C$_8$–C$_{22}$ primary or secondary alkanesulfonates, C$_8$–C$_{24}$ olefinsulfonates, sulfonated polycarboxylic acids prepared by sulfonation of the pyrolyzed product of alkaline earth metal citrates, e.g., as described in British patent specification No. 1,082,179, C$_8$–C$_{24}$ alkylpolyglycolethersulfates (containing up to 10 moles of ethylene oxide); alkyl glycerol sulfonates, fatty acyl glycerol sulfonates, fatty oleyl glycerol sulfates, alkyl phenol ethylene oxide ether sulfates, paraffin sulfonates, alkyl phosphates, isethionates such as the acyl isethionates, N-acyl taurates, alkyl succinamates and sulfosuccinates, monoesters of sulfosuccinates (especially saturated and unsaturated C$_{12}$–C$_{18}$ monoesters) and diesters of sulfosuccinates (especially saturated and unsaturated C$_6$–C$_{12}$ diesters), acyl sarcosinates, sulfates of alkylpolysaccharides such as the sulfates of alkylpolyglucoside (the nonionic nonsulfated compounds being described below), branched primary alkyl sulfates, and alkyl polyethoxy carboxylates such as those of the formula RO(CH$_2$CH$_2$O)$_k$—CH$_2$COO—M+ wherein R is a C$_8$–C$_{22}$ alkyl, k is an integer from 1 to 10, and M is a soluble salt forming cation. Resin acids and hydrogenated resin acids are also suitable, such as rosin, hydrogenated rosin, and resin acids and hydrogenated resin acids present in or derived from tall oil.

Alkylbenzene sulfonates are highly preferred. Especially preferred are linear (straight-chain) alkyl benzene sulfonates (LAS) wherein the alkyl group preferably contains from 10 to 18 carbon atoms.

Further examples are described in "Surface Active Agents and Detergents" (Vol. I and II by Schwartz, Perrry and Berch). A variety of such surfactants are also generally disclosed in U.S. Pat. No. 3,929,678, (Column 23, line 58 through Column 29, line 23, herein incorporated by reference).

When included in laundry detergent compositions of the present invention, such anionic surfactants will typically constitute from about 1% to about 40%, preferably from about 3% to about 20% by weight of the composition.

Laundry detergent compositions of the present invention may also contain cationic, ampholytic, zwitterionic, and semi-polar surfactants, as well as the nonionic and/or anionic surfactants other than those already described herein.

Cationic detersive surfactants suitable for use in laundry detergent compositions of the present invention are those having one long-chain hydrocarbyl group. Examples of such cationic surfactants include the ammonium surfactants such as alkyltrimethylammonium halogenides, and those surfactants having the formula:

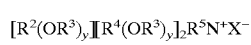

wherein R$^2$ is an alkyl or alkyl benzyl group having from about 8 to about 18 carbon atoms in the alkyl chain, each R$^3$ is selected form the group consisting of —CH$_2$CH$_2$—, —CH$_2$CH (CH$_3$)—, —CH$_2$CH (CH$_2$OH)—, —CH$_2$CH$_2$CH$_2$—, and mixtures thereof; each R is selected from the group consisting of C$_1$–C$_4$ alkyl, C$_1$–C$_4$ hydroxyalkyl, benzyl ring structures formed by joining the two R$^4$ groups, —CH$_2$CHOHCHOHCOR$^6$CHOHCH$_2$OH, wherein R$^6$ is any hexose or hexose polymer having a molecular weight less than about 1000, and hydrogen when y is not 0; $R^5$ is the same as $R^4$ or is an alkyl chain, wherein the total number of carbon atoms or R2 plus $R^5$ is not more than about 18; each y is from 0 to about 10, and the sum of the y values is from 0 to about 15; and X is any compatible anion.

Highly preferred cationic surfactants are the water soluble quaternary ammonium compounds useful in the present composition having the formula:

$$R_1R_2R_3R_4N^+X^- \quad (i)$$

wherein $R_1$ is $C_8$–$C_{16}$ alkyl, each of $R_2$, $R_3$ and $R_4$ is independently $C_1$–$C_4$ alkyl, $C_1$–$C_4$ hydroxy alkyl, benzyl, and —$(C_2H_{4O})_xH$ where x has a value from 2 to 5, and X is an anion. Not more than one of $R_2$, $R_3$ or $R_4$ should be benzyl.

The preferred alkyl chain length for $R_1$ is $C_{12}$–$C_{15}$, particularly where the alkyl group is a mixture of chain lengths derived from coconut or palm kernel fat or is derived synthetically by olefin build up or OXO alcohols synthesis.

Preferred groups for $R_2$, $R_3$ and $R_4$ are methyl and hydroxyethyl groups and the anion X may be selected from halide, methosulphate, acetate and phosphate ions.

Examples of suitable quaternary ammonium compounds of formulae (i) for use herein are:

coconut trimethyl ammonium chloride or bromide;

coconut methyl dihydroxyethyl ammonium chloride or bromide;

decyl triethyl ammonium chloride;

decyl dimethyl hydroxyethyl ammonium chloride or bromide;

$C_{12-15}$ dimethyl hydroxyethyl ammonium chloride or bromide;

coconut dimethyl hydroxyethyl ammonium chloride or bromide;

myristyl trimethyl ammonium methyl sulphate;

lauryl dimethyl benzyl ammonium chloride or bromide;

lauryl dimethyl (ethenoxy)$_4$ ammonium chloride or bromide;

choline esters (compounds of formula (i) wherein $R_1$ is $$CH_2-CH_2-O-\overset{O}{\underset{\parallel}{C}}-C_{12-14}$$

alkyl and $R_2$, $R_3$ and $R_4$ are methyl.

di-alkyl imidazolines [compounds of formula (i)].

Other cationic surfactants useful herein are also described in U.S. Pat. No. 4,228,044 and in EP 000 224.

When included in laundry detergent compositions of the present invention, such cationic surfactants will typically constitute from 0.2% to about 25%, preferably from about 1% to about 8% by weight of the composition.

Ampholytic surfactants are also suitable for use in the laundry detergent compositions of the present invention. These surfactants can be broadly described as aliphatic derivatives of secondary or tertiary amines, or aliphatic derivatives of heterocyclic secondary and tertiary amines in which the aliphatic radical can be straight- or branched-chain. One of the aliphatic substituents contains at least about 8 carbon atoms, typically from about 8 to about 18 carbon atoms, and at least one contains an anionic water-solubilizing group, e.g. carboxy, sulfonate, sulfate. See U.S. Pat. No. 3,929,678 (column 19, lines 18–35) for examples of ampholytic surfactants.

When included in laundry detergent compositions of the present invention, such ampholytic surfactants will typically constitute from 0.2% to about 15%, preferably from about 1% to about 10% by weight of the composition.

Zwitterionic surfactants are also suitable for use in laundry detergent compositions. These surfactants can be broadly described as derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 (column 19, line 38 through column 22, line 48) for examples of zwitterionic surfactants.

When included in laundry detergent compositions of the present invention, such zwitterionic surfactants will typically constitute from 0.2% to about 15%, preferably from about 1% to about 10% by weight of the composition.

Semi-polar nonionic surfactants are a special category of nonionic surfactants which include water-soluble amine oxides containing one alkyl moiety of from about 10 to about 18 carbon atoms and 2 moieties selected from the group consisting of alkyl groups and hydroxyalkyl groups containing from about 1 to about 3 carbon atoms; water-soluble phosphine oxides containing one alkyl moiety of form about 10 to about 18 carbon atoms and 2 moieties selected from the group consisting of alkyl groups and hydroxyalkyl groups containing from about 1 to about 3 carbon atoms; and water-soluble sulfoxides containing one alkyl moiety from about 10 to about 18 carbon atoms and a moiety selected from the group consisting of alkyl and hydroxyalkyl moieties of from about 1 to about 3 carbon atoms.

Semi-polar nonionic detergent surfactants include the amine oxide surfactants having the formula:

$$R^3(OR^4)xN(R^5)_2 \overset{\uparrow}{O}$$

wherein $R^3$ is an alkyl, hydroxyalkyl, or alkyl phenyl group or mixtures thereof containing from about 8 to about 22 carbon atoms; $R^4$ is an alkylene or hydroxyalkylene group containing from about 2 to about 3 carbon atoms or mixtures thereof; x is from 0 to about 3: and each $R^5$ is an alkyl or hydroxyalkyl group containing from about 1 to about 3 carbon atoms or a polyethylene oxide group containing from about 1 to about 3 ethylene oxide groups. The $R^5$ groups can be attached to each other, e.g., through an oxygen or nitrogen atom, to form a ring structure.

These amine oxide surfactants in particular include $C_{10}$–$C_{18}$ alkyl dimethyl amine oxides and $C_8$–$C_{12}$ alkoxy ethyl dihydroxy ethyl amine oxides.

When included in laundry detergent compositions of the present invention, such semi-polar nonionic surfactants will typically constitute from 0.2% to about 15%, preferably from about 1% to about 10% by weight of the composition.

The compositions according to the present invention may further comprise a builder system. Any conventional builder system is suitable for use herein including aluminosilicate materials, silicates, polycarboxylates and fatty acids, materials such as ethylenediamine tetraacetate, metal ion sequestrants such as aminopolyphosphonates, particularly ethylenediamine tetramethylene phosphonic acid and diethylene triamine pentamethylenephosphonic acid. Though less preferred for obvious environmental reasons, phosphate builders can also be used herein.

Suitable builders can be an inorganic ion exchange material, commonly an inorganic hydrated aluminosilicate material, more particularly a hydrated synthetic zeolite such as hydrated zeolite A, X, B, HS or MAP.

Another suitable inorganic builder material is layered silicate, e.g. SKS-6 (Hoechst). SKS-6 is a crystalline layered silicate consisting of sodium silicate ($Na_2Si_2O_5$).

Suitable polycarboxylates containing one carboxy group include lactic acid, glycolic acid and ether derivatives thereof as disclosed in Belgian Patent Nos. 831,368, 821,369 and 821,370. Polycarboxylates containing two carboxy groups include the water-soluble salts of succinic acid, malonic acid, (ethylenedioxy) diacetic acid, maleic acid, diglycollic acid, tartaric acid, tartronic acid and fumaric acid, as well as the ether carboxylates described in German Offenle-enschrift 2,446,686, and 2,446,487, U.S. Pat. No. 3,935,257 and the sulfinyl carboxylates described in Belgian Patent No. 840,623. Polycarboxylates containing three carboxy groups include, in particular, water-soluble citrates, aconitrates and citraconates as well as succinate derivatives such as the carboxymethyloxysuccinates described in British Patent No. 1,379,241, lactoxysuccinates described in Netherlands Application 7205873, and the oxypolycarboxylate materials such as 2-oxa-1,1,3-propane tricarboxylates described in British Patent No. 1,387,447.

Polycarboxylates containing four carboxy groups include oxydisuccinates disclosed in British Patent No. 1,261,829, 1,1,2,2,-ethane tetracarboxylates, 1,1,3,3-propane tetracarboxylates containing sulfo substituents include the sulfosuccinate derivatives disclosed in British Patent Nos. 1,398,421 and 1,398,422 and in U.S. Pat. No. 3,936,448, and the sulfonated pyrolysed citrates described in British Patent No. 1,082,179, while polycarboxylates containing phosphone substituents are disclosed in British Patent No. 1,439,000.

Alicyclic and heterocyclic polycarboxylates include cyclopentane-cis, cis-cis-tetracarboxylates, cyclopentadienide pentacarboxylates, 2,3,4,5-tetrahydrofuran-cis, cis, cis-tetracarboxylates, 2,5-tetrahydro-furan-cis, discarboxylates, 2,2,5,5,-tetrahydrofuran-tetracarboxylates, 1,2,3,4,5,6-hexane-hexacarboxylates and carboxymethyl derivatives of polyhydric alcohols such as sorbitol, mannitol and xylitol. Aromatic polycarboxylates include mellitic acid, pyromellitic acid and the phthalic acid derivatives disclosed in British Patent No. 1,425,343.

Of the above, the preferred polycarboxylates are hydroxycarboxylates containing up to three carboxy groups per molecule, more particularly citrates.

Preferred builder systems for use in the present compositions include a mixture of a water-insoluble aluminosilicate builder such as zeolite A or of a layered silicate (SKS-6), and a water-soluble carboxylate chelating agent such as citric acid.

A suitable chelant for inclusion in the detergent compositions in accordance with the invention is ethylenediamine-N,N'-disuccinic acid (EDDS) or the alkali metal, alkaline earth metal, ammonium, or substituted ammonium salts thereof, or mixtures thereof. Preferred EDDS compounds are the free acid form and the sodium or magnesium salt thereof. Examples of such preferred sodium salts of EDDS include $Na_2EDDS$ and $Na_4EDDS$. Examples of such preferred magnesium salts of EDDS include MgEDDS and $Mg_2EDDS$. The magnesium salts are the most preferred for inclusion in compositions in accordance with the invention.

Preferred builder systems include a mixture of a water-insoluble aluminosilicate builder such as zeolite A, and a water soluble carboxylate chelating agent such as citric acid.

Other builder materials that can form part of the builder system for use in granular compositions include inorganic materials such as alkali metal carbonates, bicarbonates, silicates, and organic materials such as the organic phosphonates, amino polyalkylene phosphonates and amino polycarboxylates.

Other suitable water-soluble organic salts are the homo- or co-polymeric acids or their salts, in which the polycarboxylic acid comprises at least two carboxyl radicals separated form each other by not more than two carbon atoms.

Polymers of this type are disclosed in GB-A-1,596,756. Examples of such salts are polyacrylates of MW 2000–5000 and their copolymers with maleic anhydride, such copolymers having a molecular weight of from 20,000 to 70,000, especially about 40,000.

Detergency builder salts are normally included in amounts of from 5% to 80% by weight of the composition. Preferred levels of builder for liquid detergents are from 5% to 30%.

The detergent compositions of the invention comprise enzymes which provide cleaning performance and/or fabric care benefits, as described in the aforementioned applications.

Such enzymes include proteases, lipases, cutinases, amylases, cellulases, peroxidases and oxidases (e.g. laccases).

Proteases: Any protease suitable for use in alkaline solutions can be used. Suitable proteases include those of animal, vegetable or microbial origin. Microbial origin is preferred. Chemically or genetically modified mutants are included. The protease may be a serine protease, preferably an alkaline microbial protease or a trypsin-like protease. Examples of alkaline proteases are subtilisins, especially those derived from Bacillus, e.g., subtilisin Novo, subtilisin Carlsberg, subtilisin 309, subtilisin 147 and subtilisin 168 (described in WO 89/06279). Examples of trypsin-like proteases are trypsin (e.g. of porcine or bovine origin) and the Fusarium protease described in WO 89/06270.

Preferred commercially available protease enzymes include those sold under the trade names Alcalase, Savinase, Primase, Durazym, and Esperase by Novo Nordisk A/S (Denmark), those sold under the tradename Maxatase, Maxacal, Maxapem and Properase by Gist-Brocades, those sold under the tradename Purafect and Purafect OXP by Genencor International, and those sold under the tradename Opticlean and Optimase by Solvay Enzymes. Protease enzymes may be incorporated into the compositions in accordance with the invention at a level of from 0.00001% to 2% of enzyme protein by weight of the composition, preferably at a level of from 0.0001% to 1% of enzyme protein by weight of the composition, more preferably at a level of from 0.001% to 0.5% of enzyme protein by weight of the composition, even more preferably at a level of from 0.01% to 0.2% of enzyme protein by weight of the composition.

Lipases: Any lipase suitable for use in alkaline solutions can be used. Suitable lipases include those of bacterial or fungal origin. Chemically or genetically modified mutants are included.

Examples of useful lipases include a Humicola lanuginosa lipase, e.g., as described in EP 258 068 and EP 305 216, a Rhizomucor miehei lipase, e.g., as described in EP 238 023, a Candida lipase, such as a C. antarctica lipase, e.g., the C. antarctica lipase A or B described in EP 214 761, a Pseudomonas lipase such as a P. alcaligenes and P. pseudoalcaligenes lipase, e.g., as described in EP 218 272, a P. cepacia lipase, e.g., as described in EP 331 376, a P. stutzeri lipase, e.g., as disclosed in GB 1,372,034, a P. fluorescens lipase, a Bacillus lipase, e.g., a B. subtilis lipase (Dartois et al., (1993), Biochemica et Biophysica acta 1131, 253–260), a B. stearothermophilus lipase (JP 64/744992) and a B. pumilus lipase (WO 91/16422).

Furthermore, a number of cloned lipases may be useful, including the Penicillium camembertii lipase described by Yamaguchi et al., (1991), Gene 103, 61–67), the Geotricum candidum lipase (Schimada, Y. et al., (1989), J. Biochem., 106, 383–388), and various Rhizopus lipases such as a R. delemar lipase (Hass, M. J et al., (1991), Gene 109, 117–113), a R. niveus lipase (Kugimiya et al., (1992), Biosci. Biotech. Biochem. 56, 716–719) and a R. oryzae lipase.

Other types of lipolytic enzymes such as cutinases may also be useful, e.g., a cutinase derived from Pseudomonas mendocina as described in WO 88/09367, or a cutinase derived from Fusarium solani pisi (e.g. described in WO 90/09446).

Especially suitable lipases are lipases such as M1 Lipase™, Luma fast™ and Lipomax™ (Genencor), Lipolase™ and Lipolase Ultra™ (Novo Nordisk A/S), and Lipase P "Amano" (Amano Pharmaceutical Co. Ltd.).

The lipases are normally incorporated in the detergent composition at a level of from 0.00001% to 2% of enzyme protein by weight of the composition, preferably at a level of from 0.0001% to 1% of enzyme protein by weight of the composition, more preferably at a level of from 0.001% to 0.5% of enzyme protein by weight of the composition, even more preferably at a level of from 0.01% to 0.2% of enzyme protein by weight of the composition.

Amylases: Any amylase ($\alpha$ and/or $\beta$) suitable for use in alkaline solutions can be used. Suitable amylases include those of bacterial or fungal origin. Chemically or genetically modified mutants are included. Amylases include, for example, $\alpha$-amylases obtained from a special strain of B. licheniformis, described in more detail in GB 1,296,839. Commercially available amylases are Duramyl™, Termamyl™, Fungamyl™ and BAN™ (available from Novo Nordisk A/S) and Rapidase™ and Maxamyl P™ (available from Genencor).

The amylases are normally incorporated in the detergent composition at a level of from 0.00001% to 2% of enzyme protein by weight of the composition, preferably at a level of from 0.0001% to 1% of enzyme protein by weight of the composition, more preferably at a level of from 0.001% to 0.5% of enzyme protein by weight of the composition, even more preferably at a level of from 0.01% to 0.2% of enzyme protein by weight of the composition.

Cellulases: Any cellulase suitable for use in alkaline solutions can be used. Suitable cellulases include those of bacterial or fungal origin. Chemically or genetically modified mutants are included. Suitable cellulases are disclosed in U.S. Pat. No. 4,435,307, which discloses fungal cellulases produced from Humicola insolens. Especially suitable cellulases are the cellulases having colour care benefits. Examples of such cellulases are cellulases described in European patent application No. 0 495 257.

Commercially available cellulases include Celluzyme™ produced by a strain of *Humicola insolens*, (Novo Nordisk A/S), and KAC-500(B)™ (Kao Corporation).

Cellulases are normally incorporated in the detergent composition at a level of from 0.00001% to 2% of enzyme protein by weight of the composition, preferably at a level of from 0.0001% to 1% of enzyme protein by weight of the composition, more preferably at a level of from 0.001% to 0.5% of enzyme protein by weight of the composition, even more preferably at a level of from 0.01% to 0.2% of enzyme protein by weight of the composition.

Peroxidases/Oxidases: Peroxidase enzymes are used in combination with hydrogen peroxide or a source thereof (e.g. a percarbonate, perborate or persulfate). Oxidase enzymes function in combination with oxygen (e.g. oxygen present in atmospheric air). Both types of enzymes are used for "solution bleaching", i.e. to prevent transfer of a textile dye from a dyed fabric to another fabric when said fabrics are washed together in a wash liquor, preferably together with an enhancing agent as described in e.g. WO 94/12621 and WO 95/01426. Suitable peroxidases/oxidases include those of plant, bacterial or fungal origin. Chemically or genetically modified mutants are included.

Peroxidase and/or oxidase enzymes are normally incorporated in the detergent composition at a level of from 0.00001% to 2% of enzyme protein by weight of the composition, preferably at a level of from 0.0001% to 1% of enzyme protein by weight of the composition, more preferably at a level of from 0.001% to 0.5% of enzyme protein by weight of the composition, even more preferably at a level of from 0.01% to 0.2% of enzyme protein by weight of the composition.

Mixtures of the above-mentioned enzymes are encompassed herein, e.g. a mixture of a protease, an amylase, a lipase and/or a cellulase.

Not only the above-mentioned types of enzymes, but also any other enzyme incorporated in a detergent composition of the invention will normally be incorporated in the detergent composition at a level of from 0.00001% to 2% of enzyme protein by weight of the composition, preferably at a level of from 0.0001% to 1% of enzyme protein by weight of the composition, more preferably at a level of from 0.001% to 0.5% of enzyme protein by weight of the composition, even more preferably at a level of from 0.01% to 0.2% of enzyme protein by weight of the composition.

Bleaching agents: Additional optional detergent ingredients that can be included in detergent compositions include bleaching agents such as PB1, PB4 and percarbonate with a particle size of 400–800 microns. These bleaching agent components can include one or more oxygen bleaching agents and, depending upon the bleaching agent chosen, one or more bleach activators. When present oxygen bleaching compounds will typically be present at levels of from about 1% to about 25%. In general, bleaching compounds are optional added components in non-liquid formulations, e.g. granular detergents.

The bleaching agent component for use herein can be any of the bleaching agents useful for detergent compositions including oxygen bleaches as well as others known in the art.

The bleaching agent suitable for the present invention can be an activated or non-activated bleaching agent.

One category of oxygen bleaching agent that can be used encompasses percarboxylic acid bleaching agents and salts thereof. Suitable examples of this class of agents include magnesium monoperoxyphthalate hexahydrate, the magnesium salt of meta-chloro perbenzoic acid, 4-nonylamino-4-oxoperoxybutyric acid and diperoxydodecanedioic acid. Such bleaching agents are disclosed in U.S. Pat. No. 4,483,781, U.S. Pat. No. 740,446, EP 0 133 354 and U.S. Pat. No. 4,412,934. Highly preferred bleaching agents also include 6-nonylamino-6-oxoperoxycaproic acid as described in U.S. Pat. No. 4,634,551.

Another category of bleaching agents that can be used encompasses the halogen bleaching agents. Examples of hypohalite bleaching agents, for example, include trichloro isocyanuric acid and the sodium and potassium dichloroisocyanurates and N-chloro and N-bromo alkane sulphonamides. Such materials are normally added at 0.5–10% by weight of the finished product, preferably 1–5% by weight.

The hydrogen peroxide releasing agents can be used in combination with bleach activators such as tetra-acetylethylenediamine (TAED), nonanoyloxybenzenesulfonate (NOBS, described in U.S. Pat. No. 4,412,934), 3,5-trimethyl-hexsanoloxybenzenesulfonate (ISONOBS, described in EP 120 591) or pentaacetylglucose (PAG), which are perhydrolyzed to form a peracid as the active bleaching species, leading to improved bleaching effect. In addition, very suitable are the bleach activators C8(6-octanamido-caproyl) oxybenzene-sulfonate, C9(6-nonanamido caproyl) oxybenzenesulfonate and C10 (6-decanamido caproyl) oxybenzenesulfonate or mixtures thereof. Also suitable activators are acylated citrate esters such as disclosed in European Patent Application No. 91870207.7.

Useful bleaching agents, including peroxyacids and bleaching systems comprising bleach activators and peroxygen bleaching compounds for use in cleaning compositions according to the invention are described in application U.S. Ser. No. 08/136,626.

The hydrogen peroxide may also be present by adding an enzymatic system (i.e. an enzyme and a substrate therefore) which is capable of generation of hydrogen peroxide at the beginning or during the washing and/or rinsing process. Such enzymatic systems are disclosed in European Patent Application EP 0 537 381.

Bleaching agents other than oxygen bleaching agents are also known in the art and can be utilized herein. One type of non-oxygen bleaching agent of particular interest includes photoactivated bleaching agents such as the sulfonated zinc and/or aluminium phthalocyanines. These materials can be deposited upon the substrate during the washing process. Upon irradiation with light, in the presence of oxygen, such as by hanging clothes out to dry in the daylight, the sulfonated zinc phthalocyanine is activated and, consequently, the substrate is bleached. Preferred zinc phthalocyanine and a photoactivated bleaching process are described in U.S. Pat. No. 4,033,718. Typically, detergent composition will contain about 0.025% to about 1.25%, by weight, of sulfonated zinc phthalocyanine.

Bleaching agents may also comprise a manganese catalyst. The manganese catalyst may, e.g., be one of the compounds described in "Efficient manganese catalysts for low-temperature bleaching", Nature 369, 1994, pp. 637–639.

Suds suppressors: Another optional ingredient is a suds suppressor, exemplified by silicones, and silica-silicone mixtures. silicones can generally be represented by alkylated polysiloxane materials, while silica is normally used in finely divided forms exemplified by silica aerogels and xerogels and hydrophobic silicas of various types. Theses materials can be incorporated as particulates, in which the suds suppressor is advantageously releasably incorporated in a water-soluble or waterdispersible, substantially non surface-active detergent impermeable carrier. Alternatively the suds suppressor can be dissolved or dispersed in a liquid carrier and applied by spraying on to one or more of the other components.

A preferred silicone suds controlling agent is disclosed in U.S. Pat. No. 3,933,672. Other particularly useful suds suppressors are the self-emulsifying silicone suds suppressors, described in German Patent Application DTOS 2,646,126. An example of such a compound is DC-544, commercially available form Dow Corning, which is a siloxane-glycol copolymer. Especially preferred suds controlling agent are the suds suppressor system comprising a mixture of silicone oils and 2-alkyl-alkanols. Suitable 2-alkyl-alkanols are 2-butyl-octanol which are commercially available under the trade name Isofol 12 R.

Such suds suppressor system are described in European Patent Application EP 0 593 841.

Especially preferred silicone suds controlling agents are described in European Patent Application No. 92201649.8. Said compositions can comprise a silicone/silica mixture in combination with fumed nonporous silica such as Aerosil®.

The suds suppressors described above are normally employed at levels of from 0.001% to 2% by weight of the composition, preferably from 0.01% to 1% by weight.

Other components: Other components used in detergent compositions may be employed such as soil-suspending agents, soil-releasing agents, optical brighteners, abrasives, bactericides, tarnish inhibitors, coloring agents, and/or encapsulated or nonencapsulated perfumes.

Especially suitable encapsulating materials are water soluble capsules which consist of a matrix of polysaccharide and polyhydroxy compounds such as described n GB 1,464, 616.

Other suitable water soluble encapsulating materials omprise dextrins derived from ungelatinized starch acid esters of substituted dicarboxylic acids such as described in U.S. Pat. No. 3,455,838. These acid-ester dextrins are, preferably, prepared from such starches as waxy maize, waxy sorghum, sago, tapioca and potato. Suitable examples of said encapsulation materials include N-Lok manufactured by National Starch. The N-Lok encapsulating material consists of a modified maize starch and glucose. The starch is modified by adding monofunctional substituted groups such as octenyl succinic acid anhydride.

Antiredeposition and soil suspension agents suitable herein include cellulose derivatives such as methylcellulose, carboxymethylcellulose and hydroxyethylcellulose, and homo- or co-polymeric polycarboxylic acids or their salts. Polymers of this type include the polyacrylates and maleic anhydride-acrylic acid copolymers previously mentioned as builders, as well as copolymers of maleic anhydride with ethylene, methylvinyl ether or methacrylic acid, the maleic anhydride constituting at least 20 mole percent of the copolymer. These materials are normally used at levels of from 0.5% to 10% by weight, more preferably form 0.75% to 8%, most preferably from 1% to 6% by weight of the composition.

Preferred optical brighteners are anionic in character, examples of which are disodium 4,4'-bis-(2-diethanolamino-4-anilino-s-triazin-6-ylamino)stilbene-2:2' disulphonate, disodium 4,-4'-bis-(2-morpholino-4-anilino-s-triazin-6-ylamino-stilbene-2:2'-disulphonate, disodium 4,4'-bis-(2,4-dianilino-s-triazin-6-ylamino)stilbene-2:2'-disulphonate, monosodium 4',4"-bis-(2,4-dianilino-s-tri-azin-6-ylamino) stilbene-2-sulphonate, disodium 4,4'-bis-(2-anilino-4-(N-methyl-N-2-hydroxyethylamino)-s-triazin-6-ylamino) stilbene-2,2'-disulphonate, di-sodium 4,4'-bis-(4-phenyl-2, 1,3-triazol-2-yl)-stilbene-2,2' disulphonate, di-so-dium 4,4'bis(2-anilino-4-(1-methyl-2-hydroxyethylamino)-s-triazin-6-ylamino)stilbene-2,2'disulphonate, sodium 2(stilbyl-4"-(naphtho-1',2':4,5)-1,2,3,-triazole-2"-sulphonate and 4,4'-bis(2-sulphostyryl)biphenyl.

Other useful polymeric materials are the polyethylene glycols, particularly those of molecular weight 1000–10000, more particularly 2000 to 8000 and most preferably about 4000. These are used at levels of from 0.20% to 5% more preferably from 0.25% to 2.5% by weight. These polymers and the previously mentioned homo- or co-polymeric polycarboxylate salts are valuable for improving whiteness maintenance, fabric ash deposition, and cleaning performance on clay, proteinaceous and oxidizable soils in the presence of transition metal impurities.

Soil release agents useful in compositions of the present invention are conventionally copolymers or terpolymers of terephthalic acid with ethylene glycol and/or propylene glycol units in various arrangements. Examples of such polymers are disclosed in U.S. Pat. Nos. 4,116,885 and 4,711,730 and EP 0 272 033. A particular preferred polymer in accordance with EP 0 272 033 has the formula:

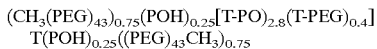

$T(POH)_{0.25}((PEG)_{43}CH_3)_{0.75}$ where PEG is —$(OC_2H_4)O$—, PO is $(OC_3H_6O)$ and T is $(pOOC_6H_4CO)$.

Also very useful are modified polyesters as random copolymers of dimethyl terephthalate, dimethyl sulfoisophthalate, ethylene glycol and 1,2-propanediol, the end groups consisting primarily of sulphobenzoate and secondarily of mono esters of ethylene glycol and/or 1,2-propanediol. The target is to obtain a polymer capped at both end by sulphobenzoate groups, "primarily", in the present context most of said copolymers herein will be endcapped by sulphobenzoate groups. However, some copolymers will be less than fully capped, and therefore their end groups may consist of monoester of ethylene glycol and/or 1,2-propanediol, thereof consist "secondarily" of such species.

The selected polyesters herein contain about 46% by weight of dimethyl terephthalic acid, about 16% by weight of 1,2-propanediol, about 10% by weight ethylene glycol, about 13% by weight of dimethyl sulfobenzoic acid and about 15% by weight of sulfoisophthalic acid, and have a molecular weight of about 3.000. The polyesters and their method of preparation are described in detail in EP 311 342.

Softening agents: Fabric softening agents can also be incorporated into laundry detergent compositions in accordance with the present invention. These agents may be inorganic or organic in type. Inorganic softening agents are exemplified by the smectite clays disclosed in GB-A-1400898 and in U.S. Pat. No. 5,019,292. Organic fabric softening agents include the water insoluble tertiary amines as disclosed in GB-A1 514 276 and EP 0 011 340 and their combination with mono $C_{12}$–$C_{14}$ quaternary ammonium salts are disclosed in EP-B-0 026 528 and di-long-chain amides as disclosed in EP 0 242 919. Other useful organic ingredients of fabric softening systems include high molecular weight polyethylene oxide materials as disclosed in EP 0 299 575 and 0 313 146.

Levels of smectite clay are normally in the range from 5% to 15%, more preferably from 8% to 12% by weight, with the material being added as a dry mixed component to the remainder of the formulation. Organic fabric softening agents such as the water-insoluble tertiary amines or dilong chain amide materials are incorporated at levels of from 0.5% to 5% by weight, normally from 1% to 3% by weight whilst the high molecular weight polyethylene oxide materials and the water soluble cationic materials are added at levels of from 0.1% to 2%, normally from 0.15% to 1.5% by weight. These materials are normally added to the spray dried portion of the composition, although in some instances it may be more convenient to add them as a dry mixed particulate, or spray them as molten liquid on to other solid components of the composition.

Polymeric dye-transfer inhibiting agents: The detergent compositions according to the present invention may also comprise from 0.001% to 10%, preferably from 0.01% to 2%, more preferably form 0.05% to 1% by weight of polymeric dye-transfer inhibiting agents. Said polymeric dye-transfer inhibiting agents are normally incorporated into detergent compositions in order to inhibit the transfer of dyes from colored fabrics onto fabrics washed therewith. These polymers have the ability of complexing or adsorbing the fugitive dyes washed out of dyed fabrics before the dyes have the opportunity to become attached to other articles in the wash.

Especially suitable polymeric dye-transfer inhibiting agents are polyamine N-oxide polymers, copolymers of N-vinyl-pyrrolidone and N-vinylimidazole, polyvinyl-pyrrolidone polymers, polyvinyloxazolidones and polyvinylimidazoles or mixtures thereof.

Aqueous liquid detergent compositions according to the present invention may suitably have a lower water content than many conventional aqueous liquid detergents. Thus, the water content of an aqueous liquid detergent suitably be less than 30%, such as less than 20%, and in some cases less than 10% by weight of the detergent composition.

Compositions of the invention may for example, be formulated as hand and/or machine laundry detergent compositions including laundry additive compositions and compositions suitable for use in the pretreatment of stained fabrics, rinse added fabric softener compositions, and compositions for use in general household hard surface cleaning operations and dishwashing operations.

The following exemplifies compositions for the present invention, but is in no way intended to limit or otherwise define the scope of the invention. In the detergent compositions, the abbreviated component identifications have the following meanings:

LAS: Sodium linear $C_{12}$ alkyl benzene sulphonate
XYAS: Sodium $C_{1X}$–$C_{1Y}$ alkyl sulfate
25EY: A $C_{12}$–$C_{15}$ predominantly linear primary alcohol condensed with an average of Y moles of ethylene oxide
XYEZS: $C_{1X}$–$C_{1Y}$ sodium alkyl sulfate condensed with an average of Z moles of ethylene oxide per mole Two examples (compositions A and B) of heavy duty liquid fabric cleaning compositions in accordance with the invention are as follows:

|  | A | B |
|---|---|---|
| LAS acid form | — | 25.0 |
| Citric acid | 5.0 | 2.0 |
| 25AS acid form | 8.0 | — |
| 25E2S acid form | 3.0 | — |
| 25E7 | 8.0 | — |
| CFAA | 5 | — |
| DETPMP | 1.0 | 1.0 |
| Fatty acid | 8 | — |
| Oleic acid | — | 1.0 |
| Ethanol | 4.0 | 6.0 |
| 1,2-Propanediol | 2.0 | 6.0 |
| Enzyme(s) | 0.10 | 0.05 |
| Coco-alkyl dimethyl hydroxy ethyl ammonium chloride | — | 3.0 |
| Smectite clay | — | 5.0 |
| PVP | 2.0 | |
| Water/Minors | Up to 100% | Up to 100% |

The minors include the shell and core polymers.

The amount of the or each enzyme in the liquid detergent typically corresponds to an amount of 0.0001 to 1 mg pure enzyme protein per liter of wash liquor.

Various test methods may be used to determine the storage stability of the concentrates of the invention. Preferably the novel concentrates give values of less than 20%, preferably less than 15 and most preferably less than 10 or 5% leakage of the original enzyme activity when determined by such tests. In particular we describe method 1 and method 2 below.

Method I

The relative leak of protease from the enzyme capsules is established by making a storage stability series with varying concentration of protease. A non-protease compatible enzyme (eg a lipase) is dosed as a liquid to the liquid detergent, and the stability of the lipase is measured as a function of time.

If the protease capsules are dosed at 1% concentration, a protease control will be dosed with non-encapsulated enzyme at dosage which correspond to a predetermined leakage, eg as follows

| | |
|---|---|
| 1% | (100% leak) |
| 0.5% | (50% leak) |
| 0.25% | (25% leak) |
| 0.1% | (10% leak) |
| 0.05% | (5% leak) |
| 0.01% | (1% leak) |

The resulting lipase stability of the protease control series is compared to the capsule-containing series and the relative leakage percent is estimated.

Method II

Reactions

The following reactions are assumed to be dominant in a liquid detergent containing a protease (P) and a non-protease enzyme (E):

| | | | | |
|---|---|---|---|---|
| I) | $P + P \to P + D_o$ | | $k_1$ | autoproteolysis of protease |
| II) | $P \to D_P$ | | $k_2$ | denaturation of protease |
| III) | $E \to D_E$ | | $k_3$ | denaturation of non-protease |
| IV) | $P + E \cdot P + D_E$ | | $k_4$ | proteolysis of non-protease | where $D_X$ is deactivated enzyme X and $k_i$ the reaction rate constant for reaction i.

Equations

From the reactions the following coupled differential equations for the concentration of protease and non-protease can be derived $$\frac{d[P]}{dt} = -k_1[P]^2 - k_2[P] \tag{1}$$

$$\frac{d[E]}{dt} = -k_4[P] \cdot [E] - k_3[E] \tag{2}$$

Equation (1) can be solved by integration:

$$\frac{[P]}{[P]_0} = \frac{k_2 \exp(-k_2 t)}{k_2 + k_1[P]_0 - k_1[P]_0 \exp(-k_2 t)} \tag{3}$$

where $[P]_0$ is the amount of protease added to the detergent.

The solution to equation (2) can be found by insertion of equation (3) and integration:

$$\frac{[E]}{[E]_0} = \exp \int \frac{k_4}{k_1} \ln\left(\frac{k_2 + k_1[P]_0 - k_1[P]_0 \exp(-k_2 t)}{k_2}\right) - k_3 t \tag{4}$$

where $[E]_0$ is the amount of non-protease added to the detergent.

Without protease in the detergent the non-protease activity is described by the second part of the RNS of equation (2) with the solution:

$$\frac{[E]}{[E]_0} = \exp(-k_3 t) \tag{5}$$

Estimation of Leaked Enzyme For Encapsulated Protease

By experiments with non-encapsulated protease and a non-protease (eg a lipase) [P] and [E] are measured as a function of time and $[P]_0$ and $[E]_0$ are known. The constants $k_1$ to $k_4$ are estimated using standard non-linear parameter estimation techniques.

By experiments with encapsulated protease and a non-protease, [E] is measured as a function of time and $[E]_0$ is known. The leaked protease $[P]_0$ is estimated using equation (4). The percent leaked protease $P_{leak}$ is then calculated by:

$$P_{leak} = 100 \cdot \frac{[P]_0}{[P]_{dosed}} \tag{6}$$

where $[P]_{dosed}$ is the dosed protease activity.

Estimation of Leaked Enzyme For Encapsulated Non-protease

By experiments with non-encapsulated non-protease $k_{3L}$ is estimated using equation (5). By experiments with encapsulated non-protease the sum of encapsulated and leaked non-protease $[E]_E + [E]_L$ are measured as function of time. The amount of non-protease $[E]_{dosed} = [E]_{E0} + [E]_{LO}$ added to the detergent is known and $[E]_{LO}$ and $k_{3E}$ are estimated using:

$$[E]_L + [E]_E = [E]_{LO} \exp(-k_{3L}) + ([E]_{dosed} - [E]_{LO}) \exp(-k_{3E}) \tag{7}$$

However, in most cases $k_{3L}$ and $k_{3E}$ are approximately equal and equation (7) can not be used. In this case experiments with non-encapsulated non-protease and a protease is performed, [P] and [E] are measured as a function of time and $[P]_0$ and $[E]_0$ are known. The constants $k_1$ and $k_4$ are estimated using standard non-linear parameter estimation techniques.

By experiments with encapsulated non-protease and protease the amount of leaked non-protease $[E]_{LO}$ is estimated using equation (4) and (5):

$$[E]_E + [E]_L = [E]_{LO} \exp\left(-\frac{k_4}{k_1} \ln\left(\frac{k_2 + k_1[P]_0 - k_1[P]_0\exp(-k_2 t)}{k_2}\right) - k_3 t\right) + \\ ([E]_{dosed} - [E]_{LO})\exp(-k_3 t) \tag{8}$$

The percent leaked non-protease $E_{Leak}$ is then calculated by:

$$E_{leak} = 100 \cdot \frac{[E]_{LO}}{[E]_{dosed}} \tag{9}$$

In order to determine the release of enzyme into wash water, which preferably results in release of least 60% and most preferably at least 80 or 90% of the original enzyme content of the capsules, it is convenient to carry out a standard Terg-o-Tometer (T-O-M) wash test. The following test demonstrates how this is conducted on a particular product.

Products: Savinase capsule products dosed at an expected activity of 0.0675 KNPU(S)/g Reference: A reference curve (measured on detergent-containing unencapsulated Savinase™) with enzyme dosed at;

| | |
|---|---|
| 0 | KNPU/g |
| 0.00675 | KNPU/g |
| 0.0135 | KNPU/g |
| 0.03375 | KNPU/g |
| 0.0675 | KNPU/g |
| 0.135 | KNPU/g |

Detergent Concentration: 2 g/l
Wash Conditions: 30° C., 10 min
Water Hardness: 15° dH
Swatches: EMPA 116, type A, 10 swatches/beaker
Procedure:
The encapsulated enzyme samples denated hereafter as I, II, III) and enzyme references are dosed into detergent concentrate (2 g detergent/sample).

At t=0 the first detergent sample is transferred to beaker no 1 of 12 (1 liter beakers).

15 sec. after the addition of detergent, the 10 swatches are put into the wash water.

The procedure is repeated until all 12 beakers have been filled.

At=10 min and 15 sec. the swatches from beaker 1 is put into rinse water, and this procedure is repeated for the swatches in the other beakers. The swatches are iron dried and the wash performance is evaluated by measuring the reflectance at 460 nm.

A calibration curve is constructed from the resulting data points for the enzyme reference, and the apparent activity for the Savinase capsule samples is read from the standard curve.

| KNPU/g | ΔR | % Performance |
|---|---|---|
| 0 | 0 | |
| 0, 0135 | 3, 86 | |
| 0, 027 | 5, 43 | |
| 0, 034 | 6, 87 | |
| 0, 067 | 8, 62 | |
| 0, 135 | 9, 83 | |
| I 243 | 8, 68 | ≈95% |
| II 252 | 8, 23 | ≈84% |
| III 253 | 8, 53 | ≈87% |

In the context of this invention proteolytic activity is expressed in Kilo NOVO Protease Units (KNPU). The activity is determined relatively to an enzyme standard (SAVINASE™) and the determination is based on the digestion of a dimethyl casein (DMC) solution by the proteolytic enzyme at standard conditions, i.e., 50° C., pH 8.3, 9 min. reaction time, 3 min. measuring time. A brochure (AF 220/1) providing further details is available upon request from Novo Nordisk A/S, Denmark.

EXAMPLE 1

Savinase aqueous preparation supplied by Novo Nordisk A/S having proteolytic activity of 44 KNPU/g (777 g) is mixed with 45% polyvinyl pyrrolidone K60 solution (190 g) and 32.4 g of diethylene triamine (DETA) added to this mixture.

An oil phase is prepared by mixing 221 g of 21% emulsion stabiliser with 208 g of a volatile hydrocarbon solvent.

The aqueous enzyme mixture containing the DETA is added to the above oil phase and homogenised with a high shear Silverson mixer to form a water-in-oil emulsion having a mean droplet size of about 3 μm. The temperature of the emulsion is kept below 40° C. during this step. After formation of the emulsion, an extra 571 g of the volatile solvent is added to dilute the W/O emulsion.

The resulting emulsion is placed under mechanical stirring and warmed to 37° C. An oil-monomer phase is prepared by dissolving 34 g of terephthaloyl chloride (TPC) in 966 g of the volatile solvent. This oil-monomer phase is added to the warm emulsion over 5 minutes to initiate the wall forming reaction. A polyamide membrane forms around the fine aqueous enzyme droplets. The reaction mixture is left stirring for 30 minutes to complete the interfacial polymerisation.

The resultant suspension has a dispersed phase which accounted for about 33% of the total weight of the suspension.

This suspension is then dehydrated by distillation and subjected to a solvent exchange process with non-ionic surfactant substantially as described in Example 1 of WO 94/25560 to provide a substantially stable dispersion in non-ionic surfactant of particles having a mean size of about 3 μm. The suspension has approximately 40 KNPU/g proteolytic activity.

In this process, shell formation is satisfactory, and a stable monoparticulate dispersion is formed both initially and after the solvent exchange and when added to detergent concentrate when the stabiliser is any of the following copolymers.

A styrene/octadecyl methacrylate/methacrylic acid copolymer in the weight ratio of 30/30/40.

Octadecyl methacrylate/methacrylic acid 66/34.

Octadecyl methacrylate/methyl methacrylate/acrylic acid 50/25/25.

Octadecyl methacrylate/methacrylic acid 64/36.

Octadecyl methacrylate/methyl methacrylate/acrylic acid/methacrylic acid 40/50/5/5.

Acrylonitrile/lauryl acrylate/acrylic acid 25/35/40.

Lauryl methacrylate/styrene/acrylic acid 40/50/10.

Styrene/docosaryl acrylate/methacrylic acid 55/35/10.

Octadecyl methacrylate/vinyl acetate/methyl methacrylate/methacrylic acid 35/10/45/10.

The resultant dispersion in non-ionic surfactant can then be blended with other components of a conventional liquid detergent concentrate thereby introducing into the detergent both the non-ionic surfactant and the particles containing enzyme.

EXAMPLE 2

A process broadly as in Example 1 is repeated except that the aqueous core composition is formed from 312 g of the aqueous Savinase, 77 g of the PVP K60 solution and 11.1 g DETA, the initial oil phase is formed from 105 g volatile hydrocarbon solvent and 66.1 g of a 30% solution of stabiliser as listed in Example 1, the emulsification is conducted using a Silverson L4R mixer at full speed for 30 minutes while cooling by ice bath, 234 g of the volatile solvent is then added to the emulsion, emulsification is continued for 2 minutes, the emulsion is placed in a 15° C. water bath while stirring and a solution of 11.8 g terephthaloyl chloride in 390 g volatile solvent is added after heating this solution to 45° C. The resulting emulsion is stirred at 15° C. for 1 hour.

Three liquid detergent compositions, A, B and C are prepared. A has the formulation given below. B consists of 99% of detergent A together with 1% Savinase capsules introduced by adding the product of this example into detergent A. Detergent C is made by mixing the same amount of Savinase, as solution, direct into detergent A. The recipe of the detergent and the storage stability is as follows Detergent A:
10.3% Dodecylbenzene sulphonic acid
3.5% Lauryl alcohol polyglycolether sulphate
0.5% Oleic acid
0.5% Coconut fatty acid
6.4% Alcohol ethoxylate (7 EO)
5.1% Sodium xylenesulphonate
0.7% Ethanol
2.7% Glycerol
0.4% Sodium sulphate
2.7% Sodium carbonate
5.5% Sodium citrate, dihydrate
1.5% Citric acid, monohydrate
1.0% Sodium tetraborate
1.7% Sodium hydroxide
1.0% Lipolase™ 100L (100,000 LU/g)
Balance: Water
pH: 8.8.

Detergent B:
99% Detergent A
1% Savinase™ capsules (11.3 KNPU/g)

Detergent C:
99% Detergent A
1% Savinase™ 12.0L (12.0 KNPU/g)

The detergents were stored at 30° C. and the residual Lipolase™ activity after 0, 3 and 7 days were analysed by Tests C and D according to the protocols shown above.

Residual Lipolase™ activities in %:

|           | days |    |    |
|-----------|------|----|----|
| Detergent | 0    | 3  | 7  |
| A         | 100  | 83 | 67 |
| B         | 100  | 74 | 55 |
| C         | 100  | 6  | 0  |

Quick and high enzymatic recovery of Savinase™ was found when diluting detergent B (with capsules) 200 times in water at 25° C.

The residual Lipolase™ activity of detergent B with capsules was significantly better than reference detergent C with liquid Savinase™, and nearly as good as for detergent without Savinase™ present (detergent A). Upon dilution the Savinase™ is quickly released from the capsules.

EXAMPLE 3

This example shows two different ways of encapsulating the enzyme wherein the enzyme is precipitated in version B before encapsulation, but not in version A.

Capsules were formed from the following ingredients, in which all amounts are specified in grams. The polymer is a copolymer of 75% by weight acrylamide and 25% acrylic acid, in the form of sodium salt of medium (for instance 150,000) molecular weight. Deta is diethylene triamine. The stabiliser is copolymer of styrene, stearyl methacrylate and acrylic acid. Isopar is a trade name for a volatile hydrocarbon. TPC is terephthalyl chloride.

|                      | A     | B     |
|----------------------|-------|-------|
| 16.1% Enzyme concentrate | 63.38 | 45.06 |
| Borax                | 0.63  | 0.45  |
| 29% Polymer          | 9.96  | 7.08  |
| 25% Na2SO4           | 0.00  | 21.63 |
| DETA                 | 1.03  | 0.78  |
| Stabiliser           | 6.10  | 4.34  |
| Isopar (Batch 1)     | 34.28 | 36.05 |
| Isopar (Batch 2)     | 34.62 | 34.62 |
| 3% TPC in Isopar     | 43.19 | 32.52 |
| Activity, KNPU       | 11.8  | 8.9   |

The capsules are made by dissolving the stabiliser in the first batch of Isopar and then emulsifying the deta into this Isopar with the application of homogenisation for 2 minutes using a Silverson (trade name) homogeniser at full speed with cooling in an ice bath for 2 minutes.

Separately, the enzyme concentrate, borax, polymer and sodium sulphate (if present), had been prepared as an aqueous enzyme phase. In process A, the solution appeared clear but in process B it appeared cloudy, as a result of precipitation of the enzyme.

The aqueous enzyme phase is slowly added to the oil phase containing deta, stabiliser and Isopar, the addition being conducted with emulsification using the Silverson for 10 minutes. The second batch of Isopar is then added, with emulsification using the Silverson being conducted for a further 2 minutes and with the water in oil emulsion being thermally equilibrated to 20° C. in a water bath.

Accordingly, in this process, the deta has been subjected to emulsification in the presence of a stabiliser for at least 14 minutes.

The solution of TPC is heated to 50° C. and is added quickly with vigorous stirring. The product is stirred for at least 30 minutes while being held at a temperature of 20° C. A suspension of the capsules in Isopar is obtained.

If desired a non-ionic surfactant (Dobanol 25-7) can be added and the Isopar then distilled off to produce a dispersion in the surfactant. Alternatively the dispersion in Isopar can be used.

The enzymatic storage stability of encapsulated protease A and B, and liquid lipase in presence of the protease capsules has been determined in a commercially available US liquid detergent (WISK Free Clear), where pH was adjusted to 10.1.

Formulations:

I: 2% Savinase 4.8 L, 1% Lipolase 100 L, 97% US liquid detergent

II: 1% savinase capsules A, 1% Lipolase 100 L, 98% US liquid detergent

III: 1% Savinase capsules B, 1% Lipolase 100 L, 98% US liquid detergent

IV: 1% Lipolase 100 L, 99% US liquid detergent.

Formulations I to IV were left at 30° C. for 0, 4 and 8 days, and the residual protease and lipase activities were measured:

Savinase stability, % residual activity:

| Formulation | days | | |
|---|---|---|---|
| | 0 | 4 | 8 |
| I | 100 | 87.2 | 79.1 |
| II | 100 | 82.9 | 67.6 |
| III | 100 | 97.4 | 91.4 |

The storage stability of protease capsules A, formulation II (without sulfate) is poorer than that of liquid protease (due to the increased concentration of active protease inside the capsules). Precipitating the protease with sulfate (capsules B, formulation III) significantly improves the storage stability compared to both capsules A and liquid protease.

Lipolase stability, % residual activity:

| Formulation | days | | |
|---|---|---|---|
| | 0 | 4 | 8 |
| I | 100 | 8.9 | — |
| II | 100 | 70.2 | 46.1 |
| III | 100 | 92.6 | 89.1 |
| IV | 100 | 92.3 | 90.2 |

The storage stability of lipase is significantly improved when precipitating the protease with sulfate. However, compared to other systems, the storage stability of the non-precipitated composition (A) was also satisfactory.

Improved results are obtained when the polymer is replaced by the use of sodium polyacrylate homopolymer of similar molecular weight and, especially, when the stabiliser is replaced by a copolymer of styrene, stearyl methacrylate and maleic anhydride.

What is claimed is:

1. A liquid detergent concentrate comprising
   (a) an outer liquid detergent phase and
   (b) particles, at least 90% of which have a diameter below 30 μm, dispersed in the outer liquid detergent phase, wherein the particles comprise (i) a shell that is formed of a condensation polymer, which is permeable to water and low molecular weight components of the outer liquid detergent phase, and (ii) a core comprising an enzyme, an inner liquid detergent phase and a core polymer wherein the core is surrounded by the polymer shell, and wherein the shell reduces the amount of the enzyme released from the core, the core polymer being present in said core in an amount effective to swell said particle upon dilution of said liquid detergent, and thereby allowing release of said enzyme through said shell.

2. A liquid detergent concentrate according to claim 1, wherein the core polymer is contained in a phase which is separate from the inner liquid detergent phase.

3. As A liquid detergent concentrate according to claim 1, wherein the condensation polymer is a polyamide.

4. A liquid detergent concentrate according to claim 1, wherein the condensation polymer is a condensate of diethylene triamine with terephthaloyl chloride.

5. A liquid detergent concentrate according to claim 1, wherein the particles are made by IFC polymerization in a water-in-oil emulsion.

6. A liquid detergent concentrate according to claim 5, wherein the particles have been made in an emulsion stabilized by an amphipathic polymeric stabilizer which is soluble or swellable in the oil phase.

7. A liquid detergent concentrate according to claim 1, wherein the enzyme is a protease.

8. A liquid detergent concentrate according to claim 1, wherein the outer liquid detergent phase further comprises an enzyme.

9. A liquid detergent concentrate according to claim 1, wherein the amount of the enzyme that permeates through the shell during storage is less than 20% of the original amount of the enzyme in the particles.

10. A liquid detergent concentrate according to claim 1, wherein at least 60% of the original activity of the enzyme in the particles is released into the wash water.

11. A liquid detergent concentrate according to claim 1, wherein the enzyme is in precipitated form.

12. A liquid detergent concentrate according to claim 11, wherein the core further comprises monomeric electrolyte and/or polymeric electrolyte in an amount sufficient to precipitate the enzyme.

13. A liquid detergent concentrate according to claim 1, wherein, upon dilution of the detergent concentrate with water to form wash water, the particles swell and the shell stretches to provide a swollen particle having a diameter at least 1.2 times the initial diameter.

14. A liquid detergent concentrate according to claim 1, wherein the condensation polymer is a polyamide or a condensate of diethylene triamine with terephthaloyl chloride and the enzyme is in precipitated form.

15. A liquid detergent concentrate according to claim 14, wherein the enzyme is precipitated by a monomeric electrolyte and/or polyelectrolyte.

16. Particles comprising an aqueous core in a shell formed of a condensation polymer by interfacial condensation, wherein the core comprises:
   (a) an enzyme in precipitated form,
   (b) a core polymer in an amount sufficient to swell the particles when introducing the particles into a wash water, and
   (c) a monomeric and/or polymeric electrolyte to precipitate the enzyme.

17. A process of making particles according to claim 16, comprising (a) forming an aqueous composition comprising the enzyme, the core polymer and the monomeric and/or polymeric electrolyte to form the enzyme in precipitated form, and (b) encapsulating the aqueous composition by IFC encapsulation, wherein the core polymer is present in the aqueous composition in an amount sufficient to swell the particles when introducing the particles into a wash water.

* * * * *